US008816992B2

(12) United States Patent
Tateuchi et al.

(10) Patent No.: US 8,816,992 B2
(45) Date of Patent: *Aug. 26, 2014

(54) DISPLAY DEVICE AND INFORMATION PROCESSING APPARATUS

(75) Inventors: Mitsuru Tateuchi, Kanagawa (JP); Go Yamanaka, Kanagawa (JP); Tsutomu Harada, Kanagawa (JP); Takeru Tamayama, Kanagawa (JP); Masafumi Matsui, Kanagawa (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 90 days.

This patent is subject to a terminal disclaimer.

(21) Appl. No.: 13/077,317

(22) Filed: Mar. 31, 2011

(65) Prior Publication Data

US 2011/0175853 A1    Jul. 21, 2011

Related U.S. Application Data

(63) Continuation of application No. 11/859,549, filed on Sep. 21, 2007, now Pat. No. 7,936,342.

(30) Foreign Application Priority Data

Oct. 10, 2006 (JP) ................. P2006-276043
Sep. 13, 2007 (JP) ................. P2007-238186

(51) Int. Cl.
  G06F 3/042     (2006.01)
  G06F 3/041     (2006.01)

(52) U.S. Cl.
  CPC ............ G06F 3/0412 (2013.01); G06F 3/0421 (2013.01)
  USPC ............... 345/175; 345/179; 345/82; 345/89; 345/204; 345/173; 178/19.01; 178/19.09; 348/401; 427/66

(58) Field of Classification Search
  USPC ......... 345/177, 88, 204, 175, 82, 84, 55, 173, 345/179; 348/14, 16, 340, 552, 14.01, 1; 348/401; 427/66; 178/19.01–19.05
  See application file for complete search history.

(56) References Cited

U.S. PATENT DOCUMENTS

| 5,602,658 | A | * | 2/1997 | Ezra et al. ............... 349/95 |
| 5,812,190 | A | * | 9/1998 | Audier et al. ............ 348/295 |
| 2002/0154082 | A1 | | 10/2002 | Zavracky et al. |
| 2004/0042681 | A1 | | 3/2004 | Takano et al. |

(Continued)

FOREIGN PATENT DOCUMENTS

| JP | 01-105989 | 4/1989 |
| JP | 10-319940 | 4/1998 |

(Continued)

OTHER PUBLICATIONS

Japanese Office Action issued Mar. 27, 2012, for corresponding Japanese Appln. No. 2007-238186.

*Primary Examiner* — Lun Yi Lao
*Assistant Examiner* — Shaheda Abdin
(74) *Attorney, Agent, or Firm* — K&L Gates LLP

(57) ABSTRACT

A display device having at least a display circuit for displaying an image, and a light receiving sensor for detecting a light disposed is provided. When a light receiving circuit region including the light receiving sensor is made a dark portion, and a region other than the light receiving circuit region is made a light portion, the display circuit and the light receiving sensor are disposed so that a spatial frequency of a repetitive pattern of the light portions and the dark portions becomes equal to or higher than 10 cpd.

2 Claims, 23 Drawing Sheets

A: LIGHT RECEIVING SENSOR
B: DUMMY BLACK

A: LIGHT RECEIVING SENSOR
B: DUMMY BLACK

(56) References Cited

U.S. PATENT DOCUMENTS

2005/0212824 A1 9/2005 Marcinkiewicz et al.
2007/0081146 A1* 4/2007 Kumagai et al. ........... 356/139.1

FOREIGN PATENT DOCUMENTS

| | | |
|---|---|---|
| JP | 2000-019478 | 1/2000 |
| JP | 2002-176162 | 6/2002 |
| JP | 2002-314756 | 10/2002 |
| JP | 2004-093894 | 3/2004 |
| JP | 2004-127272 | 4/2004 |
| JP | 2005-010407 | 1/2005 |
| JP | 2005-208580 | 8/2005 |
| JP | 2005-293374 | 10/2005 |
| JP | 2006-127212 | 5/2006 |

* cited by examiner $D = L * \tan(1)$

SPATIAL
FREQUENCY
IS LOW

SPATIAL
FREQUENCY
IS HIGH

A: LIGHT RECEIVING SENSOR
B: DUMMY BLACK

A: LIGHT RECEIVING SENSOR
B: DUMMY BLACK

A: LIGHT RECEIVING SENSOR
B: DUMMY BLACK
C: LIGHT RECEIVING SENSOR SHADED BY BLACK

DISPLAY DEVICE AND INFORMATION PROCESSING APPARATUS

CROSS REFERENCES TO RELATED APPLICATIONS

The present application is a continuation of U.S. patent application Ser. No. 11/859,549 filed Sep. 21, 2007, which claims priority to Japanese Patent Application JP 2006-276043 filed on Oct. 10, 2006, and JP 2007-238186 filed on Sep. 13, 2007, the entire contents of which are being incorporated herein by reference.

BACKGROUND

The present application relates to a display device and an information processing apparatus using the same. More particularly, the application relates to a display device and an information processing apparatus with a light receiving function which is capable of maintaining a display quality even when a light receiving resolution is made lower in level than a display resolution.

A display device is proposed which has a display circuit and a light receiving circuit disposed on the same substrate, which displays thereon an image, and which can receive a light from the outside. This display device, for example, is described in Japanese Patent Laid-open Nos. 2000-19478 and 2006-127212. The light receiving circuit of the display device detects a light emitted from an object (such as a pen) having an external light source such as a light emitting diode (LED), a light in the form of which a light emitted from a back light is reflected by a finger or a pen touching a screen to return, or the like. The applicant of this application proposes a method of driving a light receiving circuit when detecting the light in the form of which a light emitted from a back light is reflected by a finger or a pen touching a screen to return in Japanese Patent Laid-open No. 2006-127212.

Each of Japanese Patent Laid-open Nos. 2000-19478 and 2006-127212 relates to a technique about a liquid crystal display device of a type in which the display circuit controls a liquid crystal. However, a display device which displays thereon an image and receives a light by using organic electro luminescence elements as self-light emitting elements is also known. This display device, for example, is described in Japanese Patent Laid-open Nos. 2004-127272 and 2005-293374.

In the liquid crystal display device having the display circuit and the light receiving circuits disposed on the same substrate, a light transmittance decreases because no light emitted from the back light penetrates through a region having the light receiving circuit disposed therein. Therefore, it is recommended that when a light receiving resolution at a high level is unnecessary for the display device, the number of light receiving circuits disposed on the substrate is reduced as much as possible, thereby making a light receiving resolution lower in level than a display resolution. With regard to the case where the light receiving resolution at the high level is unnecessary for the display device, for example, there is the case where an interface is specialized by using a touch sensor. In the interface using the touch sensor, it has to be determined whether or not a touch (depression) is made, or whether a movement is made in a touch state. Thus, the light receiving resolution at the high level is unnecessary for the display device. In addition, a size of the finger or pen touching the screen of a display panel is much larger than that of one pixel. Hence, it is also unnecessary to dispose light receiving sensors in all the pixels.

However, when the number of light receiving circuits is reduced, a user who sees an image displayed on the screen may feel a sense of incompatibility. For this reason, a problem may be caused in the display quality.

SUMMARY

The present application has been made in the light of such circumstances, and it is therefore desirable to provide a display device and an information processing apparatus using the same which is capable of maintaining a display quality even when a light receiving resolution is made lower in level than a display resolution.

According to an embodiment, a display device includes at least a display circuit for displaying an image, and a light receiving sensor for detecting a light disposed therein. When a light receiving circuit region including the light receiving sensor is made a dark portion, and a region other than the light receiving circuit region is made a light portion, the display circuit and the light receiving sensor are disposed so that a spatial frequency of a repetitive pattern of the light portions and the dark portions becomes equal to or higher than 10 cpd.

In the display device according to the embodiment, when the light receiving circuit region including the light receiving sensor is made the dark portion, and the region other than the light receiving circuit region is made the light portion, the display circuit and the light receiving sensor are disposed so that the spatial frequency of the repetitive pattern of the light portions and the dark portions becomes equal to or higher than 10 cpd.

According to another embodiment, an information processing apparatus includes display light receiving means having at least a display circuit for displaying an image, and a light receiving sensor for detecting a light disposed thereon, the display light receiving means serving to display predetermined information in a form of an image and serving to detect a light through the light receiving sensor; input information analyzing means for analyzing externally inputted information such as information inputted by a user by using a light receiving image generated from a light receiving signal outputted from the light receiving sensor; and control means for executing predetermined control processing in accordance with a message supplied thereto from the input information analyzing means, in which when a light receiving circuit region including the light receiving sensor is made a dark portion, and a region other than the light receiving circuit region is made a light portion in the display light receiving means, the display circuit and the light receiving sensor are disposed so that a spatial frequency of a repetitive pattern of the light portions and the dark portions becomes equal to or higher than 10 cpd.

In the information processing apparatus according to the another embodiment, at least the display circuit for displaying thereon an image, and the light receiving sensor for detecting a light are disposed, the predetermined information is displayed in the form of the image, and the light receiving sensor detects the light. Also, the input information inputted by the user is analyzed by using the light receiving image generated from the light receiving signal outputted from the light receiving sensor, and the predetermined control processing is executed in accordance with the message supplied as a result of the analysis. Also, when the light receiving circuit region including the light receiving sensor is made the dark portion, and the region other than the light receiving circuit region is made the light portion in the display light receiving means of the information processing apparatus, the display circuit and the light receiving sensor are disposed so that the spatial frequency of the repetitive pattern of the light portions and the dark portions becomes equal to or higher than 10 cpd.

According to still another embodiment, there is provided a display device including a display circuit for displaying an image, and at least a light receiving sensor for detecting a light disposed therein, in which when a display region including the display circuit is made a light portion, and a portion other than the display region is made a dark portion, the display circuit and the dark portion are disposed so that a spatial frequency of a repetitive pattern of the light portions and the dark portions becomes equal to or higher than 10 cpd, and at least a part of the dark portion is a light receiving circuit region including the light receiving sensor.

According to yet another embodiment, an information processing apparatus includes display light receiving means having at least a display circuit for displaying an image, and a light receiving sensor for detecting a light disposed thereon, the display light receiving means serving to display predetermined information in a form of an image and serving to detect a light through the light receiving sensor; input information analyzing means for analyzing externally inputted information such as information inputted by a user by using a light receiving image generated from a light receiving signal outputted from the light receiving sensor; and control means for executing predetermined control processing in accordance with a message supplied thereto from the input information analyzing means, in which when a light receiving circuit region including the light receiving sensor is made a dark portion, and a region other than the light receiving circuit region is made a light portion in the display light receiving means, the display circuit and the light receiving sensor are disposed so that a spatial frequency of a repetitive pattern of the light portions and the dark portions becomes equal to or higher than 10 cpd, and at least a part of the dark portion is a light receiving circuit region including the light receiving sensor.

According to an embodiment, even when the light receiving resolution is made lower in level than the display resolution, the display quality can be maintained.

Additional features and advantages are described herein, and will be apparent from, the following Detailed Description and the figures.

DETAILED DESCRIPTION

The present application will be described in greater detail below according to an embodiment with reference to the accompanying drawings.

A display device according to an embodiment is one (for example, a display panel 25 shown in FIG. 1) having at least a display circuit (for example, a display circuit 41 shown in FIG. 2) for displaying an image, and a light receiving sensor (for example, a light receiving sensor SSR shown in FIG. 3) for detecting a light disposed therein, in which when a region (for example, a light receiving circuit region 71 shown in FIG. 9) of the light receiving sensor is made a dark portion, and a region (for example, a pixel Pix region shown in FIG. 9) other than the light receiving sensor is made a light portion, the display circuit and the light receiving sensor are disposed so that a spatial frequency of a repetitive pattern of the light portions and the dark portions becomes equal to or higher than 10 cpd.

Figure 1:
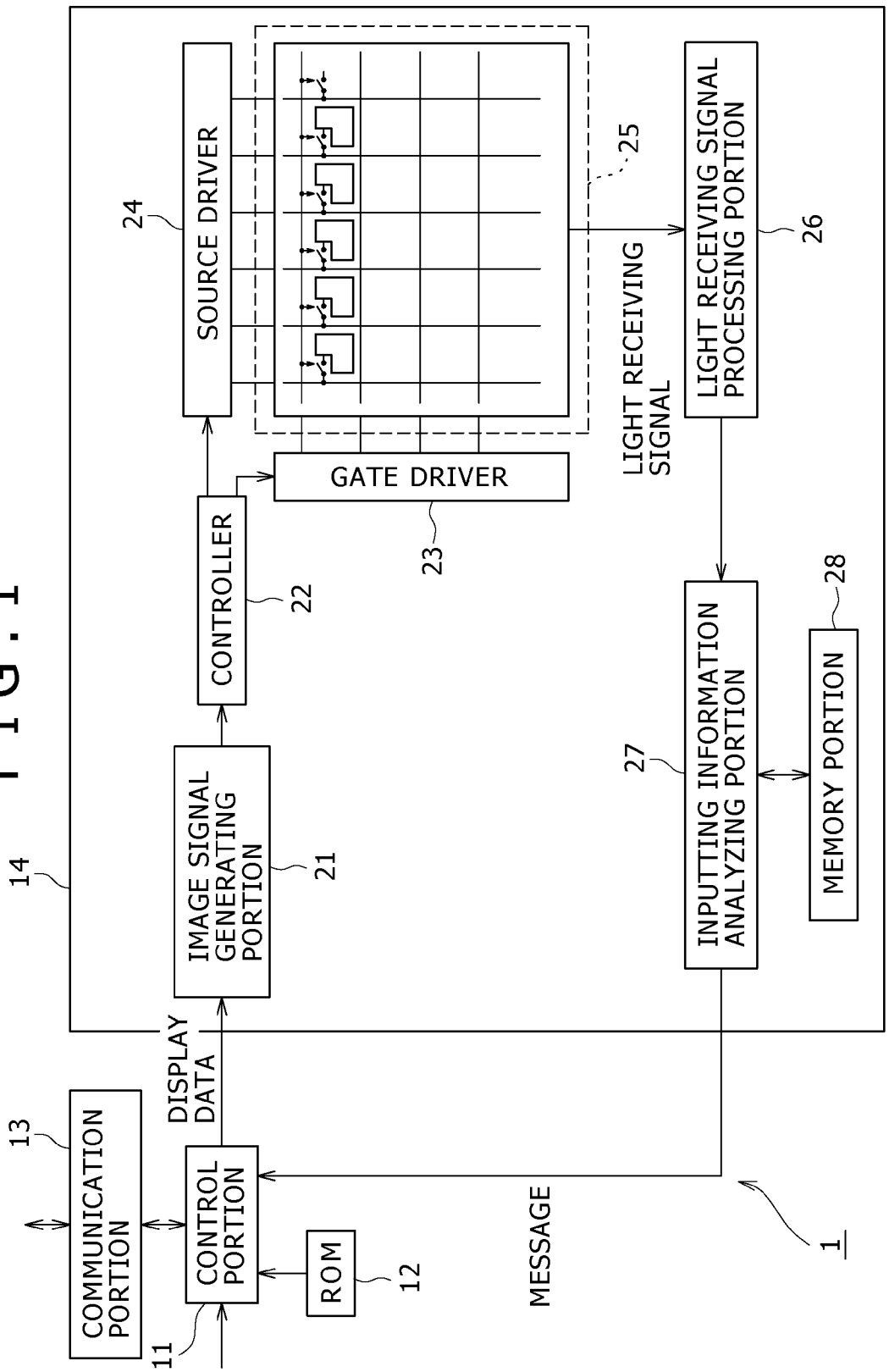
FIG. 1 is a diagram showing an example of a configuration of an information processing apparatus according to an embodiment.

An information processing apparatus (for example, an information processing apparatus 1 shown in FIG. 1) according to another embodiment includes: display light receiving means (for example, a display panel 25 shown in FIG. 1) having at least a display circuit for displaying an image, and a light receiving sensor for detecting a light disposed therein, the display light receiving means serving to display predetermined information in the form of an image and serving to detect a light through the light receiving sensor; input information analyzing means (for example, an input information analyzing portion 27 shown in FIG. 1) for analyzing input information inputted by a user by using a light receiving image generated from a light receiving signal outputted from the light receiving sensor; and control means (for example, a control portion 11 shown in FIG. 1) for executing predetermined control processing in accordance with a message supplied thereto from the input information analyzing means. When a light receiving circuit region including the light receiving sensor is made a dark region, and a region other than the light receiving circuit region is made a light portion in the display light receiving means, the display circuit and the light receiving sensor are disposed so that a spatial frequency of a repetitive pattern of the light portions and the dark portions becomes equal to or higher than 10 cpd.

FIG. 1 shows a structural example of an information processing apparatus according to an embodiment.

The information processing apparatus 1 shown in FIG. 1 is a mobile phone, a digital camera, a personal digital assistant (PDA) or the like. Here, the information processing apparatus 1 includes at least a display device for displaying thereon predetermined information in the form of an image, and executes predetermined information processing such as call processing, image capturing processing, and processing for transmitting/receiving data. With this information processing apparatus 1, predetermined information can be inputted by making the pointing on a screen of the display device by a finger, a pen, or the like.

The information processing apparatus 1 is composed of a control portion 11, a read only memory (ROM) 12, a communication portion 13, a display processing portion 14, and the like. The display processing portion 14 corresponds to the display device described above. Also, the display processing portion 14 is composed of an image signal generating portion 21, a controller 22, a gate driver 23, a source driver 24, a display panel 25, a light receiving signal processing portion 26, an input information analyzing portion 27, and a memory portion 28.

The control portion 11 controls an entire operation of the information processing apparatus 1 in accordance with a control program stored in the ROM 12. For example, the control portion 11 supplies display data to the image signal generating portion 21 in accordance with an instruction issued from another module (not shown) or data received by the communication portion 13. Here, the display data is intended to be displayed on the display panel 25. In addition, the control portion 11, as will be described later, also updates the display data which is supplied to the image signal generating portion 21, and supplies data to the communication portion 13 or another module in accordance with a message supplied from the input information analyzing portion 27.

Here, another module, for example, is a module or the like for carrying out a call function when the information processing apparatus 1 is a mobile phone. Alternatively, another module is a module or the like for carrying out an image capturing function when the information processing apparatus 1 is a digital still camera. The communication portion 13 communicates with any of various kinds of apparatuses in a wired or wireless manner through a network such as the Internet, and supplies the acquired data to the control portion 11. It is noted that when it is unnecessary for the information processing apparatus 1 to communicate with the outside, the communication portion 13 can be omitted.

The image signal generating portion 21 generates an image signal about an image corresponding to the display data supplied thereto from the control portion 11. Also, the image signal generating portion 21 outputs the image signal thus generated to the controller 22 for controlling the driving for the display panel 25.

The controller 22 controls the driving for the gate driver 23, and the driving for the source driver 24. Here, the gate driver 23 controls ON (conduction) or OFF (non-conduction) of a switching element which is disposed in each of picture elements in the display panel 25. Also, the source driver 24 supplies a voltage signal (hereinafter referred to as "a display signal") corresponding to the image signal to each of the picture elements in conjunction with the driving for the gate driver 23.

The display panel 25, for example, is constituted by a liquid crystal display (LCD) in which the picture elements of m×n are disposed in matrix. Here, the picture elements of m×n mean that the m picture elements are disposed in a horizontal direction, and the n picture elements are disposed in a vertical direction. In addition, the display panel 25 displays thereon predetermined information in the form of an image by changing a transmittance of a light emitted from a back light (not shown) in a liquid crystal layer. Also, the display panel 25 has a light receiving sensor built therein. Thus, the light receiving sensor receives a return light in the form of which the light emitted from the back light is reflected by a finger, a pen or the like contacting or being close to a surface of an uppermost portion of the display panel 25 to turn. Also, the light receiving sensor supplies the resulting light receiving signal to the light receiving signal processing portion 26. For this reason, a display circuit for displaying an image, and a light receiving circuit for detecting a light as input information are provided in the display panel 25.

It is noted that one picture element as a unit (a display unit of an image) of the display resolution is composed of three picture elements of R(Red), G(Green), and B(Blue). Hence, the total number of picture elements constituting the display panel 25 strictly becomes (3m×n). Hereinafter, the picture element as the unit, of the display resolution, composed of the three picture elements of R, G, and B is referred to as "a pixel", and each of the picture elements of R, G, and B constituting the pixel is referred to as "a sub pixel".

The light receiving signal processing portion 26 executes predetermined amplifying processing, filtering processing, image processing, or the like for the light receiving signal supplied from the display panel 25. Also, the light receiving signal processing portion 26 supplies the shaped light receiving signal after execution of such processing to the input information analyzing portion 27.

The input information analyzing portion 27 analyzes a position (contact position) on the screen pointed by the finger, the pen, or the like by using the light receiving image generated from the light receiving signal, thereby analyzing information inputted by the user. Also, the input information analyzing portion 27 supplies the analysis result in the form of a message to the control portion 11. For example, it is assumed that the light receiving signal processing portion 26 supplies the light receiving signal of an N-th frame to the input information analyzing portion 27. In this case, the input information analyzing portion 27 compares the light receiving image generated from the light receiving signal of the N-th frame with the light receiving image of a previous frame ((N−1)-th frame) stored in the memory portion 28, and calculates a difference between both the light receiving images. Also, the input information analyzing portion 27 analyzes a motion of the contact position from the previous frame based on the difference thus calculated. When there are a plurality of contact positions, the input information analyzing portion 27 analyzes each of the plurality of contact positions. Moreover, the input information analyzing portion 27 compares the current information with information, stored in the memory portion 28, on a change in each of contact positions from before a predetermined time period. As a result, the input information analyzing portion 27 determines the message, about the detection of the contact position, which is intended to be supplied to the control portion 11.

In the display panel 25 of the information processing apparatus 1 configured in the manner as described above, one light receiving circuit is disposed every disposition of the N pixels in the horizontal direction. As apparent from this, the light receiving resolution is lower in level than the display resolution.

Hereinafter, a description will be firstly given with respect to the case where the light receiving resolution is identical in level to the display resolution, that is, the case where the pixels and the light receiving circuits are disposed so as to show one-to-one correspondence. Next, a description will be given with respect to the case, adopted in the display panel 25, where the light receiving resolution is lower in level than the display resolution in comparison with the above case.

Figure 2:
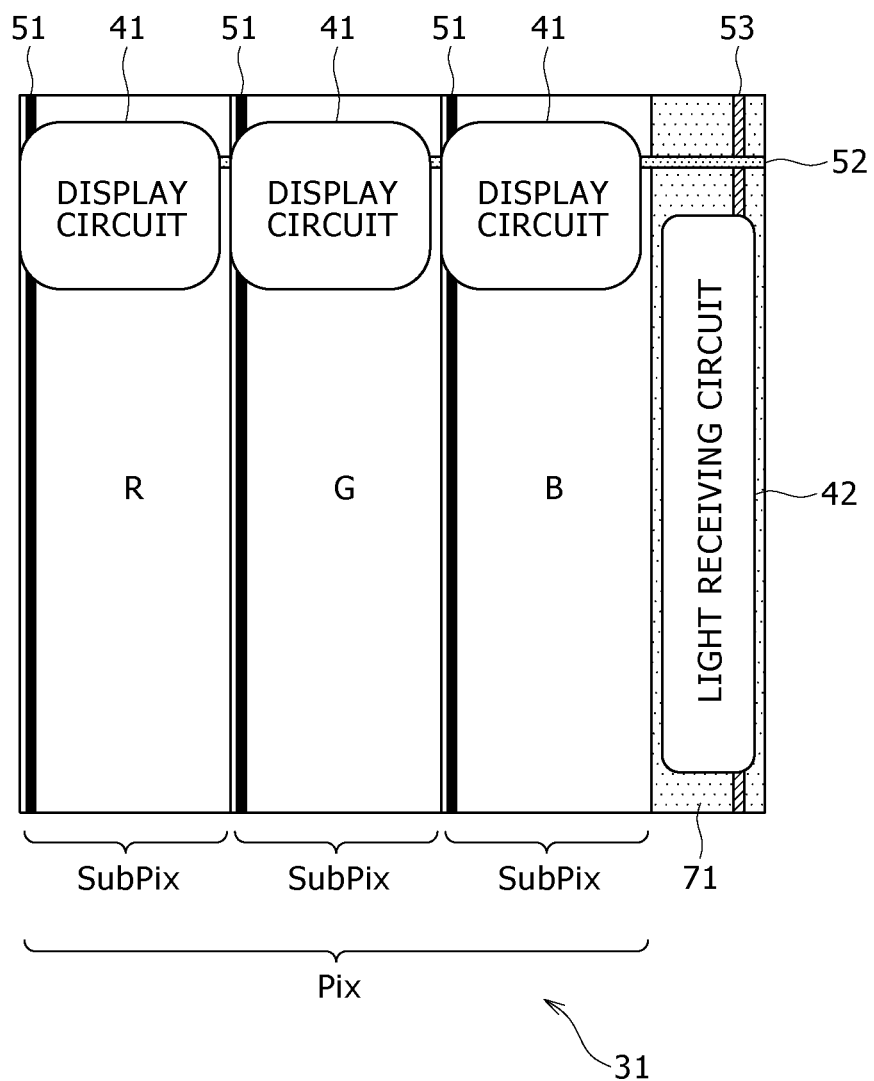
FIG. 2 is a diagram showing an example of a structure of a basic unit when a light receiving resolution is identical in level to a display resolution.

FIG. 2 shows a structural example of a basic unit of a pixel disposition when the light receiving resolution is identical in level to the display resolution.

When the light receiving resolution is identical in level to the display resolution, the structure is made such that the basic unit 31 shown in FIG. 2 is repetitively disposed in a horizontal direction in the entire display.

The basic unit 31 is structured such that the pixel Pix, and the light receiving circuit region 71 having the light receiving circuit 42 disposed therein are disposed in the horizontal direction. The pixel Pix is composed of sub pixels SubPix of R, G, and B each having the display circuit 41. The display circuits 41, and the light receiving circuit 42 are formed on the same substrate (glass substrate).

Display signal lines 51 are connected to the display circuits 41 of the sub pixels SubPix of R, G, and B, respectively. The source driver 24 supplies the display signal to the display circuits 41 through the display signal lines 51, respectively. In addition, the display circuits 41 of the sub pixels SubPix of R, G, and B are also connected to the same display selection line 52 extending in the horizontal direction. A display selection signal outputted from the gate driver 23 is supplied to the display circuits of the sub pixels SubPix of R, G, and B through the display selection line 52. Each of the display circuits 41 controls a light emitted from the back light in accordance with the display selection signal and the display signal.

Figure 3:
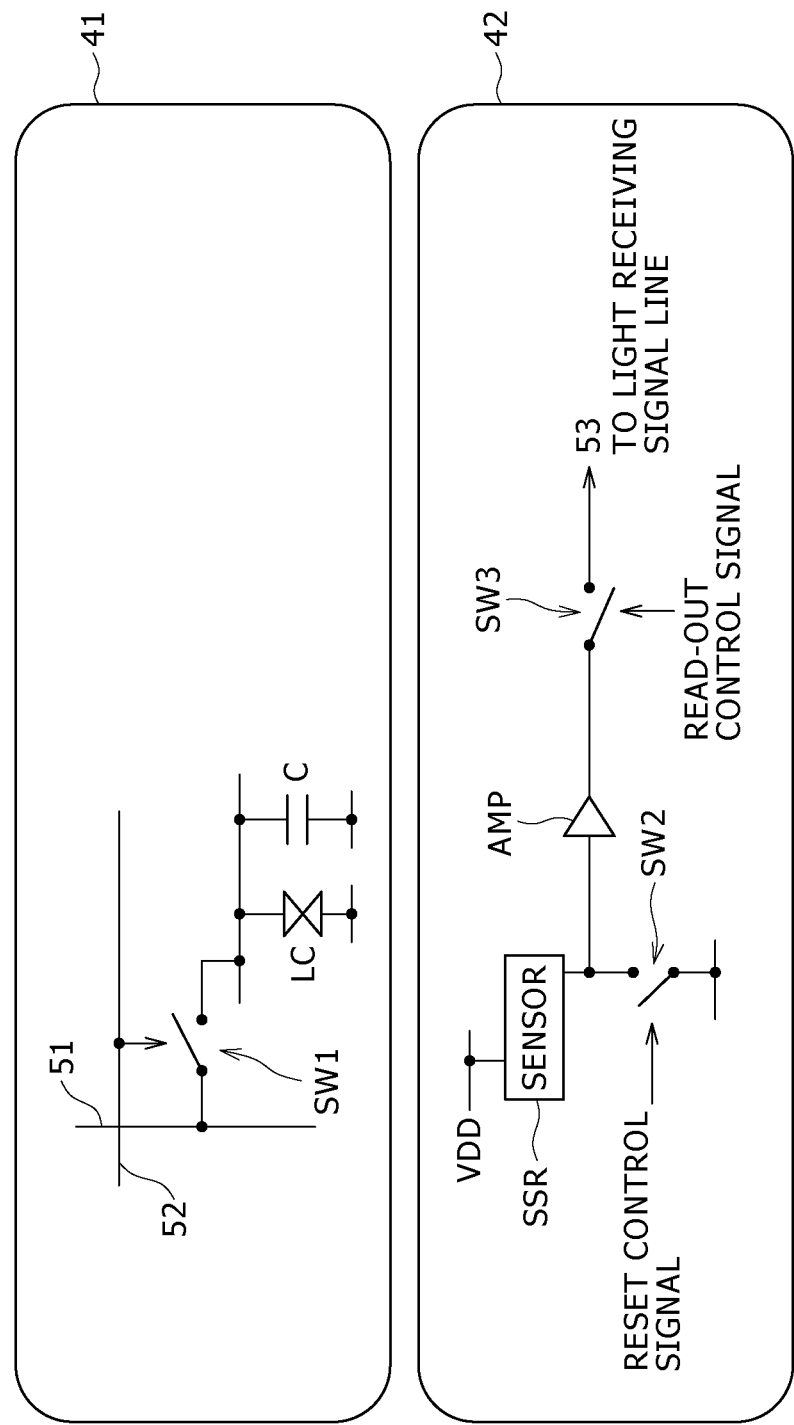
FIG. 3 is a circuit diagram showing circuit examples of a display circuit and a light receiving circuit shown in FIG. 2.

On the other hand, the light receiving circuit 42 controls light reception made by a light receiving sensor SSR (refer to FIG. 3). Thus, the light receiving circuit 42 supplies the light receiving signal which the light receiving sensor SSR receives the light to generate to the light receiving signal processing portion 26 through the light receiving signal line 53 wired in the vertical direction within a light receiving circuit region 71.

FIG. 3 shows circuit examples of the display circuit 41 and the light receiving circuit 42.

The display circuit 41 is composed of a switching element SW1, a liquid crystal layer LC, a holding capacitor C, and the like. The switching element SW1, for example, is constituted by a thin film transistor (TFT).

In the display circuit 41, the switching element SW1 is turned ON or OFF for connection in accordance with the display selection signal supplied thereto from the gate driver 23 through the display selection line 52. While the switching element SW1 is held in an ON state, the display signal supplied from the source driver 24 is supplied to each of the liquid crystal layer LC and the holding capacitor C through the display signal line 51. As a result, a predetermined voltage is applied to each of the liquid crystal layer LC and the holding capacitor C. In the liquid crystal layer LC, the arrangement of the liquid crystal molecules changes in accordance with the applied voltage, so that the light emitted from the back light is emitted to the front side of the display panel 25. On the other hand, while the switching element SW1 is held in an OFF state, the voltage applied to each of the liquid crystal layer LC and the holding capacitor C is held therein. Turn-ON and turn-OFF of the switching element SW1 are sequentially switched in the vertical direction one horizontal line by one horizontal line with the sub pixels SubPix disposed horizontally in a row as the horizontal line, that is, the scanning is performed in a line-sequential manner, thereby displaying an image on the entire display panel 25.

The light receiving circuit 42 is composed of switching elements SW2 and SW3, a sensor SSR, and an amplifier AMP. Each of the switching elements SW2 and SW3, for example, is constituted by a TFT. Also, the sensor SSR, for example, is constituted by a photodiode, a TFT or the like.

The sensor SSR receives a light made incident thereto through a surface of the display panel 25, and outputs a current signal corresponding to a quantity of received light to the amplifier AMP. The amplifier AMP converts the current signal inputted thereto into a voltage signal, amplifies the resulting voltage signal, and outputs the amplified voltage signal in the form of a light receiving signal. The switching element SW3 is turned ON or OFF for connection in accordance with a read-out control signal. While the switching element SW3 is held in an ON state, the light receiving signal outputted from the amplifier AMP is supplied to the light receiving signal processing portion 26 through a light receiving signal line 53. The switching element SW2 is turned ON or OFF for connection in accordance with a reset control signal. While the switching element SW2 is held in an ON state, the light receiving signal is reset.

The display circuit 41 and the light receiving circuit 42 configured in the manner as described above are disposed in the sub pixel SubPix and the light receiving circuit region 71 of FIG. 2, respectively.

It is noted that the display panel 25 can also be realized in the form of an EL display using an organic or inorganic EL elements as self-light emitting elements instead of being adopted in the form of the LCD.

Figure 4:
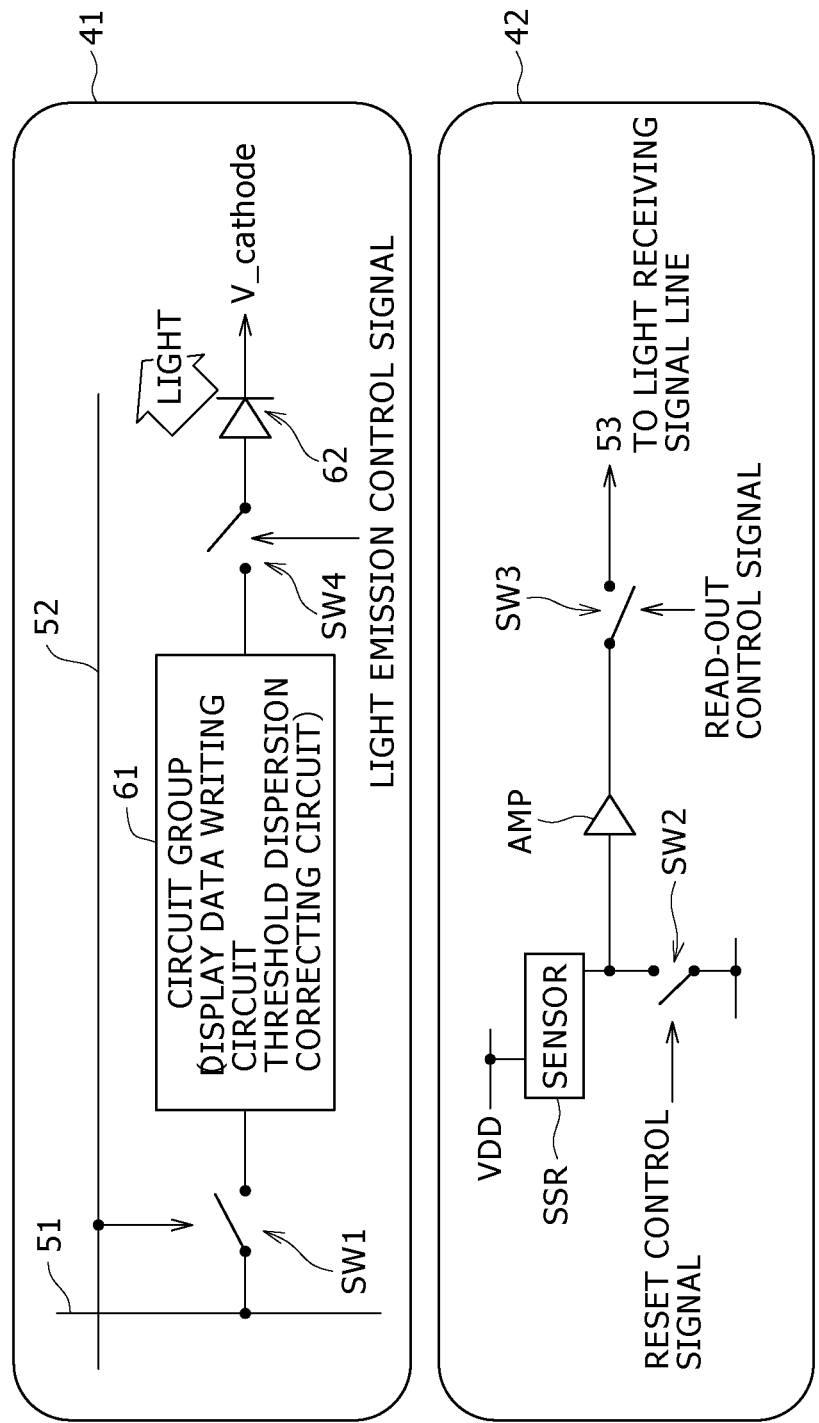
FIG. 4 is a circuit diagram showing circuit examples of the display circuit and the light receiving circuit when a display panel is constituted by an EL display.

FIG. 4 shows circuit examples of the display circuit 41 and the light receiving circuit 42 when the display panel 25 is structured in the form of the EL display. It is noted that since the light receiving circuit 42 has the same structure as that of the light receiving circuit 42 shown in FIG. 3, its description is omitted here for the sake of simplicity.

The display circuit 41 is composed of switching elements SW1 and SW4, a circuit group 61, and an EL element 62.

The circuit group 61, for example, is composed of a display data writing circuit, a threshold dispersion correcting circuit, and the like. The display data writing circuit is a current/voltage (I/V) converting circuit for converting the display signal (voltage signal) supplied thereto through the switching element SW1 into a current signal. Also, the threshold dispersion correcting circuit is a circuit (a circuit for correcting a threshold of a TFT) for correcting a dispersion of the display signal due to the switching element SW1.

The switching element SW1 is turned ON or OFF for connection in accordance with the display selection signal supplied thereto from the gate driver 23 through the display selection line 52. While the switching element SW1 is held in an ON state, the display signal supplied from the source driver 24 is supplied to the circuit group 61 through the display signal line 51. The circuit group 61 executes the processing such as the I/V correction and dispersion correction described above for the display signal inputted thereto, and outputs the display signal obtained after execution of the processing to the switching element SW4. The switching element SW4 is turned ON or OFF for connection in accordance with a light emission control signal. While the switching element SW4 is held in an ON state, the display signal sent from the circuit group 61 is supplied to the EL element 62. As a result, the EL element 62 emits a light.

It is noted that the read-out control signal, the reset signal, and the light emission control signal which have been described with reference to FIGS. 3 and 4 are supplied from the gate driver 23 or the source driver 24 through a control line (not shown).

Figure 5:
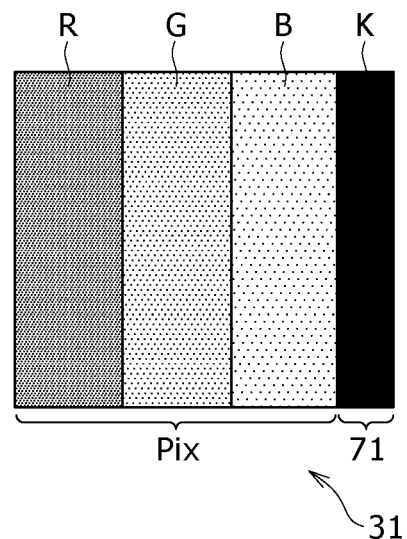
FIG. 5 is a diagram showing a display state of the basic unit shown in FIG. 2.

FIG. 5 shows a display state of the basic unit 31 shown in FIG. 2.

As has been described with reference to FIG. 3, when the display circuit 41 causes the liquid crystal layer LC to transmit the light emitted from the back light by controlling the liquid crystal layer LC, as shown in FIG. 5, the sub pixels SubPix of R, G, and B display a red color (R), a green color (G), and a blue color (B), respectively. On the other hand, the light receiving circuit region 71 is a region which does not transmit the light emitted from the back light. As a result, a user recognizes the light receiving circuit region 71 as a black color (K).

In FIG. 5, a color difference among R, G, and B are shown in the form of a contrast density of half-tone dot meshing. That is to say, the red color corresponding to the sub pixel SubPix of R is shown in the form of the half-tone dot meshing having a high density, and the green color corresponding to the sub pixel SubPix of G is shown in the form of the half-tone dot meshing having a middle density. Also, the blue color corresponding to the sub pixel SubPix of B is shown in the form of the half-tone dot meshing having a low density. This is also applied to each of other figures which will be described later.

Hereinafter, the sub pixels SubPix of R, G, and B are also referred to as an R sub pixel, a G sub pixel, and a B sub pixel, respectively.

Figure 6:
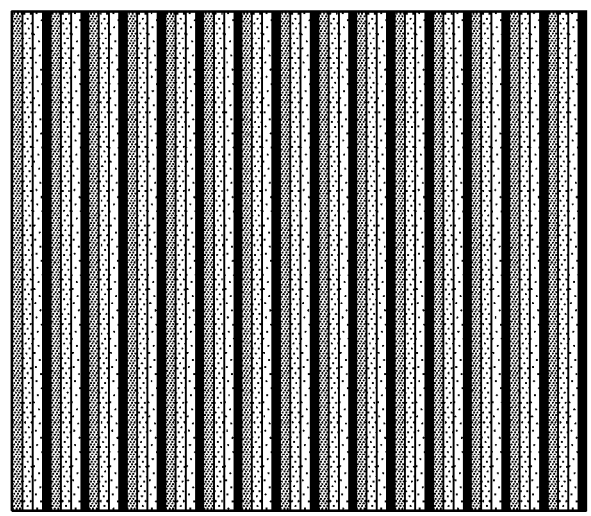
FIG. 6 is a diagram when the display state of the basic unit shown in FIG. 5 is viewed from the entire display.

When the display state of the basic unit 31 shown in FIG. 5 is viewed in terms of the entire display, it is as shown in FIG. 6. That is to say, since the basic unit 31 is repetitively disposed in the horizontal direction, the entire display becomes a stripe of the red color (R), the green color (G), the blue color (B), and the black color (K).

Figure 7:
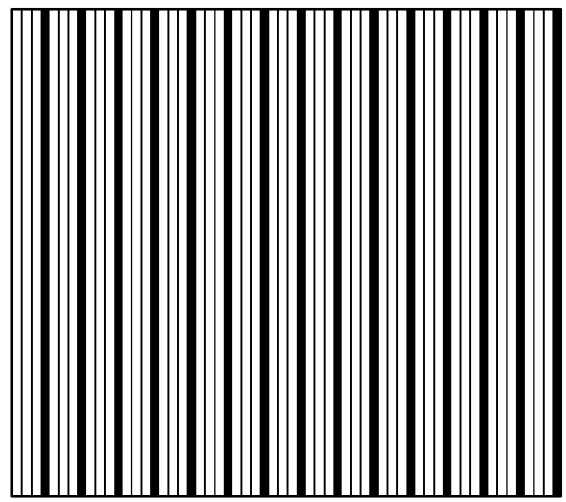
FIG. 7 is a diagram showing a state of FIG. 6 viewed from a user.

However, the stripe of the red color, the green color, and the blue color shown in FIG. 6 is viewed as a white color due to the mixing of the red color, the green color, and the blue color. As a result, the stripe, as shown in FIG. 7, seems to display a repetitive pattern of the white color and the black color from eyes of the user. It is noted that a duty ratio between the white color and the black color is no object.

Figure 8:
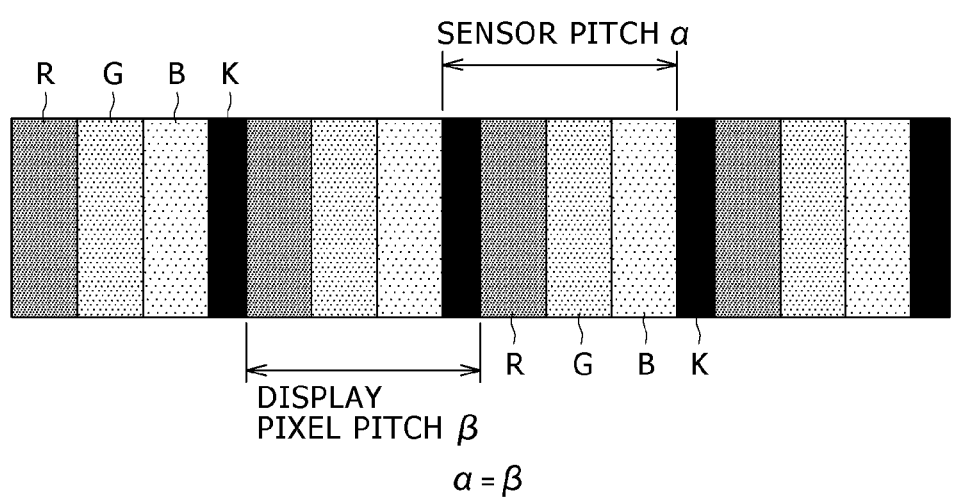
FIG. 8 is a diagram explaining a sensor pitch and a display pixel pitch in a dispersion of the basic unit shown in FIG. 2.

An interval of black color lines in the repetitive pattern of the white color and the black color, as shown in FIG. 8, is a distance between each two light receiving circuit regions 71, and is set as a sensor pitch α. The sensor pitch α is also equal to a display pixel pitch β as an interval of the pixels Pix. Therefore, when the light receiving resolution is identical in level to the display resolution, a relationship of the sensor pitch α=the display pixel pitch β is established.

Figure 9:
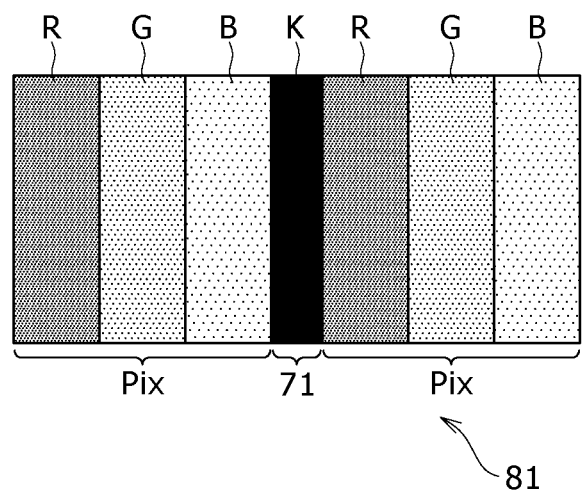
FIG. 9 is a diagram showing a structural example and a display state of the basic unit when the light receiving resolution is half the display resolution.

FIG. 9 shows a structural example and a display state of the basic unit when the light receiving resolution is half the display resolution.

When the light receiving resolution is half the display resolution, in the entire display, the basic unit 81 shown in FIG. 9 is repetitively disposed in the horizontal direction. Thus, the basic unit 81 is composed of two pixels Pix and one light receiving circuit region 71.

Also, the R sub pixel, the G sub pixel, and the B sub pixel of the basic unit 81 display the red color (R), the green color (G), and the blue color (B), respectively, and the light receiving circuit region 71 is recognized as the black color (K) by the user. Hence, when the display state of the basic unit 81 is viewed in terms of the entire display, it is as shown in FIG. 10.

Figure 10:
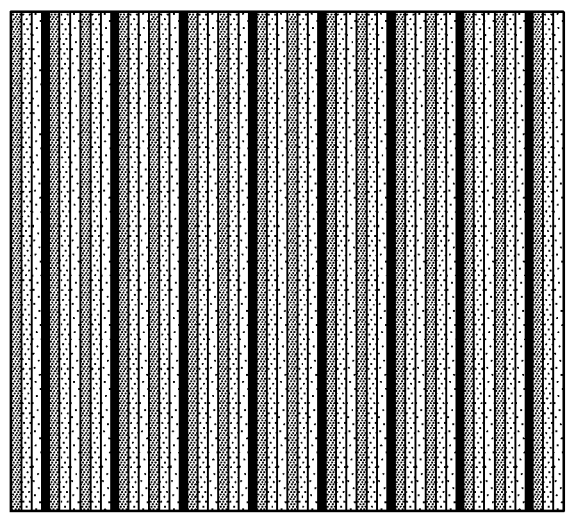
FIG. 10 is a diagram showing a display state of the basic unit shown in FIG. 9.
Figure 11:
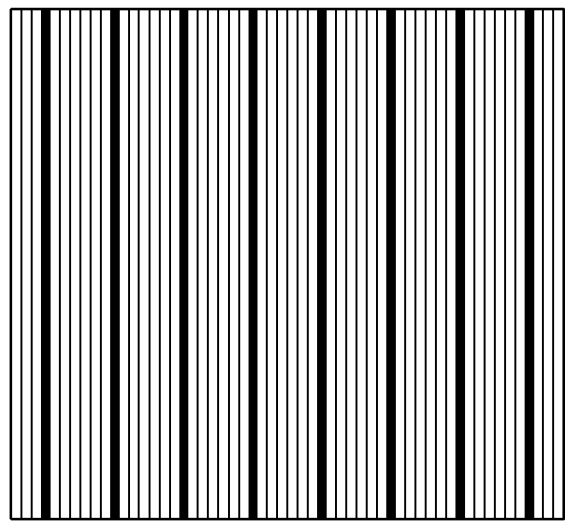
FIG. 11 is a diagram showing a state of FIG. 10 viewed from the user.

The stripe of the red color (R), the green color (G), the blue color (B), and the black (K) shown in FIG. 10 seems to be the repetitive pattern of the white color (light portion) and the black color (dark portion) as shown in FIG. 11 from the eyes of the user. As apparent from comparison of this case with the case of FIG. 7, the interval of the black color line at this time becomes larger than that when the light receiving resolution is identical in level to the display resolution as shown in FIG. 7. As a result, an area of the black color portions in the entire display becomes smaller than that shown in FIG. 7.

Figure 12:
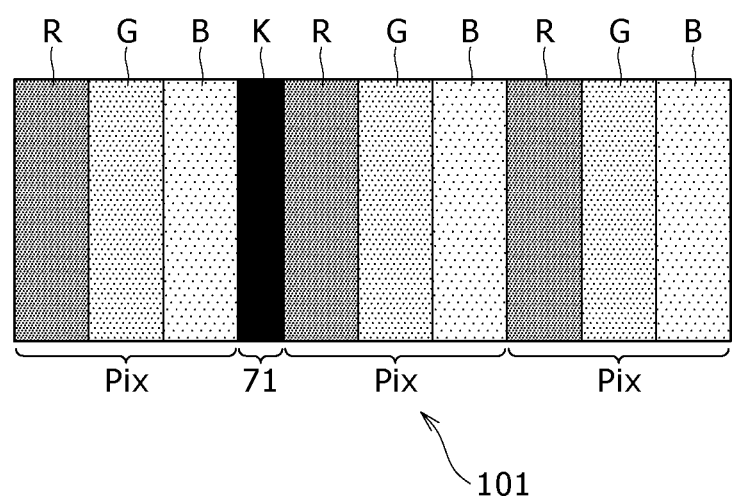
FIG. 12 is a diagram showing a structural example and a display state of the basic unit when the light receiving resolution is third the display resolution.

FIG. 12 shows a structural example and a display state of the basic unit when the light receiving resolution is third the display resolution.

When the light receiving resolution is third the display resolution, in the entire display, the basic unit 101 shown in FIG. 12 is repetitively disposed in the horizontal direction. Thus, the basic unit 101 is composed of three pixels Pix and one light receiving circuit region 71.

Also, the R sub pixel, the G sub pixel, and the B sub pixel of the basic unit 101 display the red color (R), the green color (G), and the blue color (B), respectively, and the light receiving circuit region 71 is recognized as the black color (K) by the user. Hence, when the display state of the basic unit 101 is viewed in terms of the entire display, it is as shown in FIG. 13.

Figure 13:
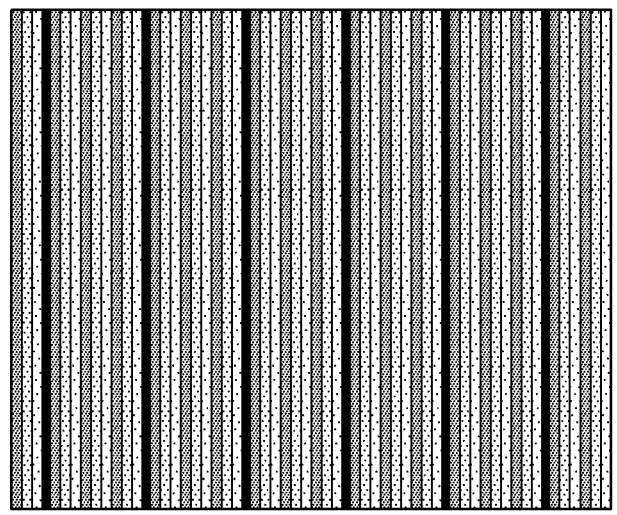
FIG. 13 is a diagram showing a display state of the basic unit shown in FIG. 12.
Figure 14:
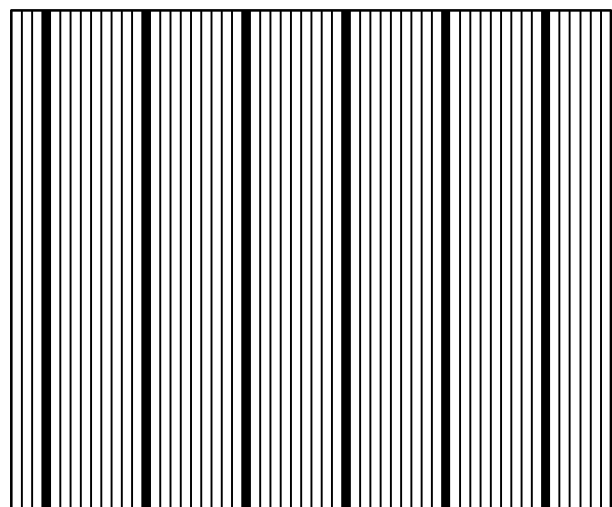
FIG. 14 is a diagram showing a display state of FIG. 13 viewed from the user.

The stripe of the red color (R), the green color (G), the blue color (B), and the black color (K) of FIG. 13 seems to be the repetitive pattern of the white color and the black color as shown in FIG. 14 from the eyes of the user. The interval of the black color lines at this time becomes further larger than that in each of the case where the light receiving resolution is identical in level to the display resolution as shown in FIG. 7, and the case where the light receiving resolution is half the display resolution as shown in FIG. 11. As a result, the area of the black color portions in the entire display becomes further smaller than that in each of the case shown in FIG. 7 and the case shown in FIG. 11.

Figure 15:
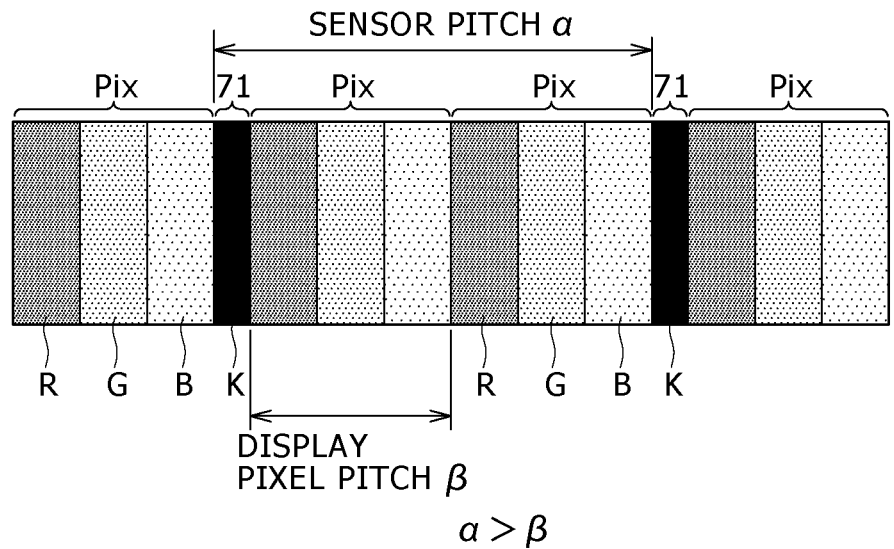
FIG. 15 is a diagram explaining the sensor pitch and the display pixel pitch when the light receiving resolution is made lower in level than the display resolution.

As described above, when the light receiving resolution is reduced so as to be half, third, . . . the display resolution, as shown in FIG. 15, the sensor pitch α becomes larger than the display pixel pitch β(α>β), and a difference (α−β) between the sensor pitch α and the display pixel pitch β becomes gradually large. Note that, the display pixel pitch β when the light receiving resolution is made lower than the display resolution is set as one having the shorter distance of the interval at which the light receiving circuit region 71 is sandwiched between the pixels Pix, and the interval at which no light receiving circuit region 71 is sandwiched between the pixels Pix.

When the sensor pitch α becomes gradually larger, the region displayed with the black color becomes less in terms of the entire display. As a result, the light transmittance increases and the optical specification is enhanced.

However, when the interval of the black color lines obtained by arranging the light receiving circuit regions 71 in the vertical direction becomes larger than a predetermined interval, that is, when the sensor pitch α becomes larger than the predetermined interval, the black color line is recognized as a streak based on the visual sense spatial processing characteristics of a human being. Thus, even though the optical specification is enhanced, the sensor pitch α may not be set as being endlessly large.

Then, a description will now be given with respect to the optimal sensor pitch α based on the visual sense spatial processing characteristics of the human being when the light receiving resolution is made lower in level than the display resolution with reference to FIGS. 16 to 19.

Figure 16:
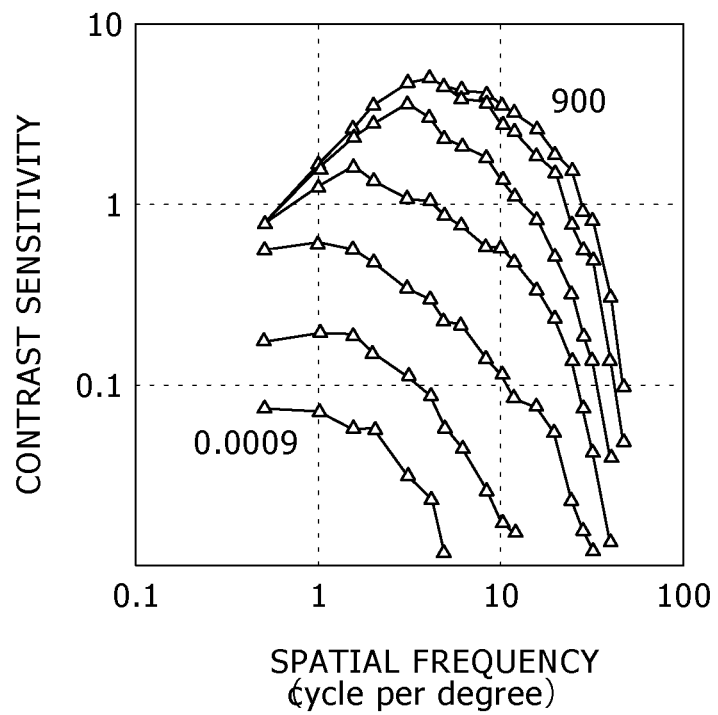
FIG. 16 is a graph showing a correlation between a spatial frequency and a contrast sensitivity.

FIG. 16 shows a correlation between the spatial frequency and the contrast sensitivity, plotted for various average retinal illuminances as a parameter. The details of the correlation between the spatial frequency and the contrast sensitivity are described in "Vision Information Processing Handbook (first edition)" edited and written by The Vision Society of Japan, Asakura Publishing Co., Ltd., p. 194, FIG. 5.4.

In a graph shown in FIG. 16, an axis of abscissa represents the spatial frequency, and an axis of ordinate represents the contrast sensitivity. Here, each of the axis of abscissa and the axis of ordinate is a logarithmic axis.

Figure 17:
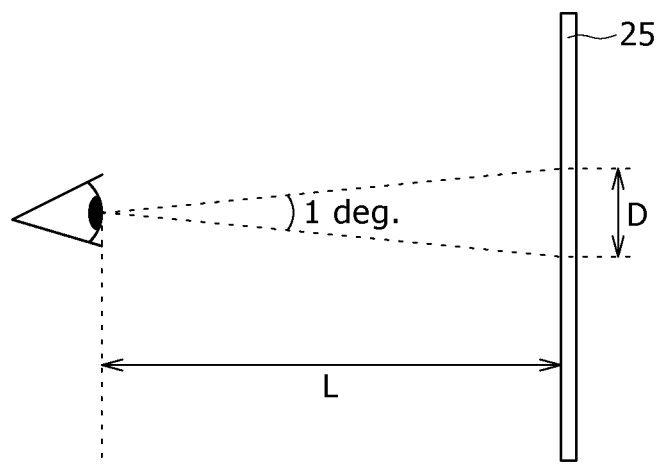
FIG. 17 is a view explaining the spatial frequency.

The spatial frequency represented by the axis of abscissa in FIG. 16, as shown in FIG. 17, means a change in contrast density (contrast), of the white color and the black color, which falls within the visual angle of 1° (degree) of the human being. The unit of the spatial frequency is cpd (cycle per degree).

Next, when it is assumed that the display panel 25 is at a distance L from each of the eyes of the human being, the visual angle of 1° of the human being corresponds to a width D, calculated from (the distance L×tan(1)), on the screen of the display panel 25. Therefore, in other words, the spatial frequency means how many changes in contrast density of the white color and the black color are contained in the width D of the display panel 25.

Figure 18:
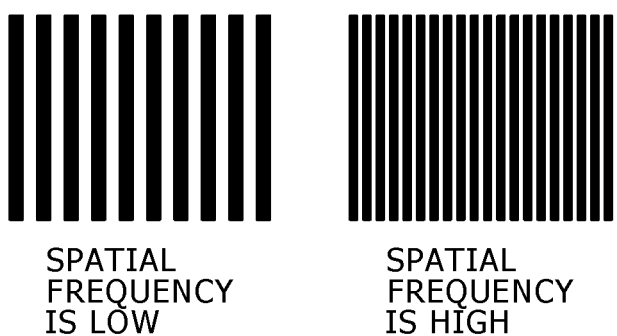
FIG. 18 is a diagram explaining the spatial frequency.
Figure 19:
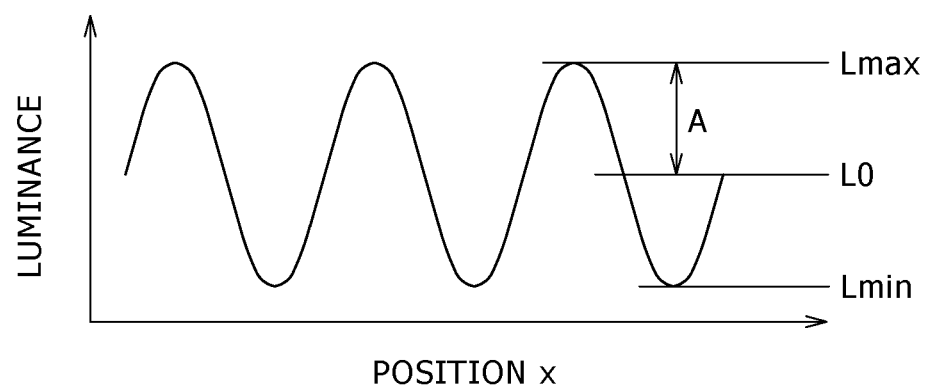
FIG. 19 is a waveform chart explaining Michelson contrast.

A state in which the spatial frequency is low, as shown in the left-hand side of FIG. 18, is one in which the number of changes in contrast density of the white color and the black color is small. On the other hand, a state in which the spatial frequency is high, as shown in the right-hand side of FIG. 18, is one in which the number of changes in contrast density of the white color and the black color is large. It is noted that although the change in contrast density of the white color and the black color is shown in the form of a repetition of a binary of the white color and the black color in FIG. 18, actually, a luminance when the color change is made from the black color to the white color, or from the white color to the black color changes gently as represented by a sine wave curve as shown in FIG. 19.

On the other hand, the contrast sensitivity represented by the axis of ordinate of FIG. 16 means a reciprocal number of a contrast threshold. Thus, a relationship of contrast sensitivity=(1/contrast threshold) is established. Here, the contrast threshold means a minimum contrast at which a visual stimulus (the luminance due to a change in contrast density of the white color and the black color) can be recognized by the human being.

The Michelson contrast as a ratio with respect to an average luminance L0 of an amplitude of a sine wave, for example, is adopted as the contrast when the contrast threshold is measured. When a maximum luminance and a minimum luminance of the sine wave, as shown in FIG. 19, are Lmax and Lmin, respectively, the Michelson contrast can be obtained from the following expression (1):

$$\text{Michelson contrast}=(L\max-L\min)/(L\max+L\min). \quad (1)$$

In the correlation between the spatial frequency and the contrast sensitivity obtained in the manner as described above, as shown in FIG. 16, the contrast sensitivity gradually increases as the spatial frequency decreases. Thus, the correlation of FIG. 16 represents that even the object having the small luminance change can be visualized as the spatial frequency further decreases.

This represents that when the spatial frequency becomes equal to or lower than the predetermined value, that is, when the sensor pitch α becomes equal to or larger than the predetermined interval, the black color line due to the light receiving circuit region 71 is recognized as the streak on the display panel 25 by the user.

Then, when the light receiving resolution is made lower in level than the display resolution in the display panel 25 of the information processing apparatus 1, in other words, when the light receiving circuit regions 71 are discretely reduced and disposed such that one light receiving circuit region 71 is disposed every N pixels Pix, the sensor pitch α is set which becomes the value of the spatial frequency at which no black color line is recognized as the streak.

More specifically, as long as the spatial frequency is equal to or higher than 10 cpd and equal to or lower than 18 cpd, the image displayed on the display panel 25 can be visualized without feeling a sense of incompatibility. Moreover, the spatial frequency is equal to or higher than 18 cpd, the image can be visualized similarly to the case where the light receiving resolution is identical in level to the display resolution. For example, in the case where it is supposed that the information processing apparatus 1 is the mobile phone, the PDA, or the like, and the distance L from each of the eyes of the user of the information processing apparatus 1 to the display panel 25 is about 20 cm, the sensor pitch a when the spatial frequency is 10 cpd corresponds to 350 μm, and the sensor pitch α when the spatial frequency is 18 cpd corresponds to 195 μm.

Therefore, in the information processing apparatus 1 as the mobile phone, the PDA, or the like, the light receiving circuit regions 71 are disposed so that the sensor pitch α becomes equal to or smaller than 350 μm in the horizontal direction of the display panel 25. As a result, even when the light receiving resolution is made lower in level than the display resolution, the display quality can be maintained. Note that, when the sensor pitch α is set as being equal to or larger than 195 μm, the light receiving circuit regions 71 are disposed such that importance is attached to the light transmittance rather than the light receiving resolution.

Note that, when the information processing apparatus 1 is the television receiver or the like, the distance L at which the user visualizes the display panel 25 is different from that of the above case. Hence, the sensor pitch α at which the spatial frequency becomes equal to or higher than 10 cpd is also different from that of the above case. Therefore, the sensor pitch α in the display panel 25 is determined in correspondence to the most general distance L at which the user visualizes the display panel 25 of the information processing apparatus 1. However, when the spatial frequency becomes equal to or higher than 10 cpd and equal to or lower than 18 cpd, even if the light receiving resolution is made lower in level than the display resolution, the display quality can be maintained.

Next, a description will now be given with respect to the setting of a width of the R sub pixel, the G sub pixel, and the B sub pixel, and a width of the light receiving circuit region 71 when the light receiving resolution is made lower in level than the display resolution.

Figure 20:
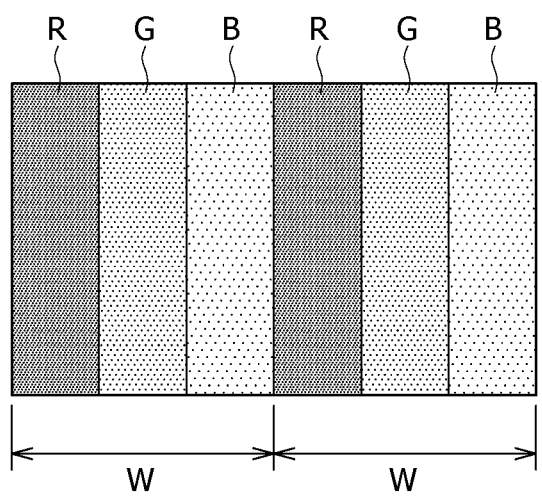
FIG. 20 is a diagram explaining a width W of a pixel in a display panel having no light receiving function.
Figure 21:
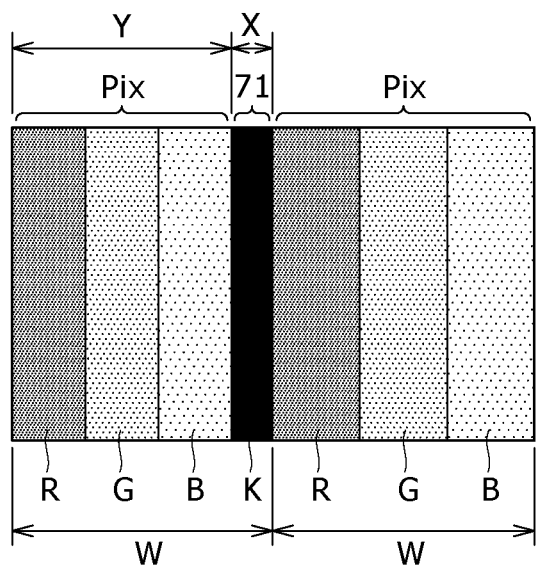
FIG. 21 is a diagram explaining an example of a disposition when a light receiving circuit region is disposed so as for its width to fall within the width W of the pixel.

When as shown in FIG. 20, the width of one pixel Pix in the display panel (not shown) having no light receiving function is W, the width Y of the R sub pixel, the G sub pixel, and the B sub pixel of the pixel Pix having the light receiving circuit region 71 disposed therein is shortened as shown in FIG. 21, so that the sum of the width Y of the pixel Pix and the width X of the light receiving circuit region 71 becomes W. In this case, the stricture is simple because no change is necessary for any of other pixels Pix each having no light receiving circuit region 71 disposed therein.

However, when the pixel Pix and the light receiving circuit region 71 are provided so as for the total width thereof to fall within the width W of one pixel Pix in such a manner, the following problem is caused.

That is to say, when the pixel Pix on the left-hand side of the light receiving circuit region 71 displays the black color in FIG. 21, the line width which is felt as the black color by the user, including the black color of the light receiving circuit region 71, becomes the sum of the width Y of the pixel Pix and the width X of the light receiving circuit region 71, that is, the width W.

On the other hand, when the pixel Pix on the right-hand side of the light receiving circuit region 71 displays the black color as shown in FIG. 21, the line width which is felt as the black color by the user, including the black color of the light receiving circuit region 71, becomes the sum of the width W of the pixel Pix displaying the black color, and the width X of the light receiving circuit region 71, that is, the width (X+W).

Figure 22A:
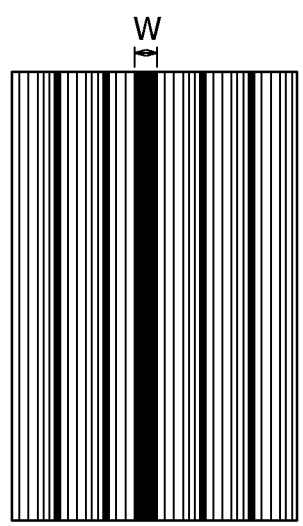
FIGS. 22A and 22B are respectively diagrams each explaining a program caused when the disposition shown in FIG. 21 is adopted.
Figure 22B:
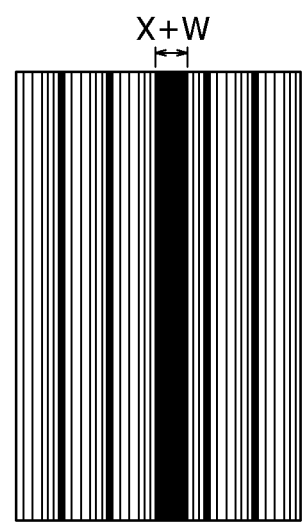

Therefore, as shown in FIGS. 22A and 22B, even when the same one pixel Pix displays the black color, there are the case where the black color is displayed in the width W (refer to FIG. 22A) and the case where the black color is displayed in the width (X+W) (refer to FIG. 22B).

The phenomenon that the color is displayed in different widths in spite of the same one pixel Pix causes the user to feel the sense of incompatibility, especially, when a character or a figure, such as a numeral such as "1", or a ruled line, adopted to be represented by one pixel is displayed with one pixel.

Then, in the display panel 25 of the information processing apparatus 1, when the light receiving circuit regions 71 are discretely reduced so that one light receiving circuit region 71 is disposed every N pixels Pix, and thus the horizontal light receiving resolution is reduced in level to 1/N of the display resolution, a width Y' of the entire pixel Pix is set so as to meet a relationship of (N×W)=(N×Y'+X).

Figure 23:
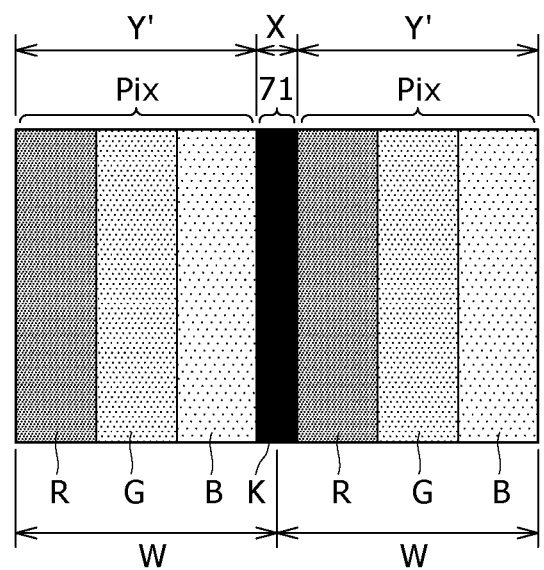
FIG. 23 is a diagram explaining a width Y' of the pixel adopted in the display panel shown in FIG. 1.

For example, when the light receiving circuit regions 71 are discretely reduced so that one light receiving circuit region 71 is horizontally disposed every two pixels Pix, and thus the horizontal light receiving resolution is reduced in level to 1/N of the display resolution, as shown in FIG. 23, the width Y' of the entire pixel Pix is set so as to meet a relationship of (2×W)=(2×Y'+X).

As a result, even when which pixel Pix displays the black color, the user is prevented from feeling the sense of incompatibility. That is to say, even when the light receiving resolution is made lower in level than the display resolution, the display quality can be maintained.

As described above, in the display panel 25 of the information processing apparatus 1, when the region of the pixel Pix is made the light portion, and the light receiving circuit region 71 having the light receiving circuit 41 disposed therein is made the dark portion, the light receiving circuit regions 71 are discretely reduced and disposed for the disposition of the pixels Pix so that the spatial frequency of the repetitive pattern of the light portions and the dark portions becomes equal to or higher than 10 cpd (and equal to or lower than 18 cpd). As a result, since the black color line formed by arranging the light receiving circuit regions 71 in the vertical direction is prevented from being recognized as the streak by the user, the display quality can be maintained. That is to say, even when the light receiving resolution is made lower in level than the display resolution, the display quality can be maintained.

When the light receiving circuit regions 71 are discretely reduced so that one light receiving circuit region 71 is horizontally disposed every N pixels Pix, and thus the horizontal light receiving resolution is reduced in level to 1/N of the display resolution, the width Y' of the entire pixel Pix in the display panel 25 is set so as to meet the relationship of (N×W)=(N×Y'+X) for the width W of the pixel Pix when the display panel 25 has no light receiving circuit region 71 disposed therein. As a result, since even when any pixels display the line or the character, the line or the character can be displayed so as to have the same line width, the display quality can be maintained. That is to say, even when the light receiving resolution is made lower in level than the display resolution, the display quality can be maintained.

It is noted that although in the embodiment described above, the light receiving circuit regions 71 are disposed horizontally in a row with respect to the pixels Pix, the light receiving circuit regions 71 may also be disposed vertically in a row. In this case, the light receiving circuit regions 71 are discretely reduced and disposed in the vertical direction so that the spatial frequency of the repetitive pattern of the light portions and the dark portions becomes equal to or higher than 10 cpd (and equal to or lower than 18 cpd).

In addition, the description has been given with respect to the embodiment in which the light receiving circuit 42 is provided as the light receiving circuit region 71 separately from each of the R sub pixel, the G sub pixel, and the B sub pixel. However, the light receiving circuit 42 may also be disposed in any of the R sub pixel, the G sub pixel, and the B sub pixel. In this case, a distance between the adjacent two light receiving circuits 42 is the sensor pitch α.

Figure 24:
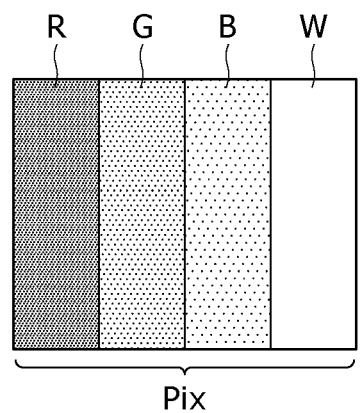
FIG. 24 is a diagram showing an example in which the pixel is composed of R, G, B, and W.

In the embodiment described above, the description has been given with respect to the structure that the pixel Pix is composed of the R sub pixel, the G sub pixel, and the B sub pixel. In addition, however, as shown in FIG. 24, there is also a display device in which the pixel Pix is composed of the R sub pixel, the G sub pixel, the B sub pixel, and a white (W) sub pixel. The present application can be applied to such a display device in which the pixel Pix is composed of the R sub pixel, the G sub pixel, the B sub pixel, and the W sub pixel.

Figure 25:
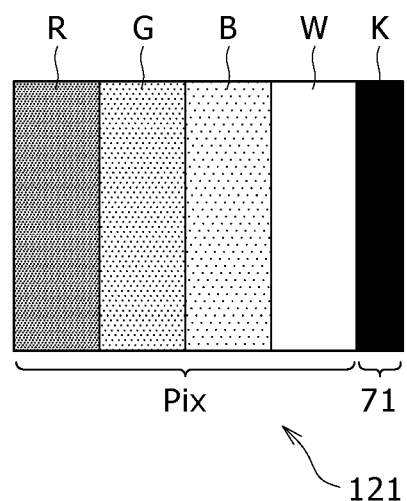
FIG. 25 is a diagram showing a structural example of a basic unit when the light receiving resolution is made identical in level to the display resolution by using the pixel shown in FIG. 24.

When the pixel Pix is composed of the R sub pixel, the G sub pixel, the B sub pixel, and the W sub pixel, and the light receiving resolution is identical in level to the display resolution, a basic unit 121 shown in FIG. 25 is repetitively disposed in the horizontal direction in the entire display. The basic unit 121 is composed of the pixel Pix including the R sub pixel, the G sub pixel, the B sub pixel, and the W sub pixel, and one light receiving circuit region 71.

Figure 26:
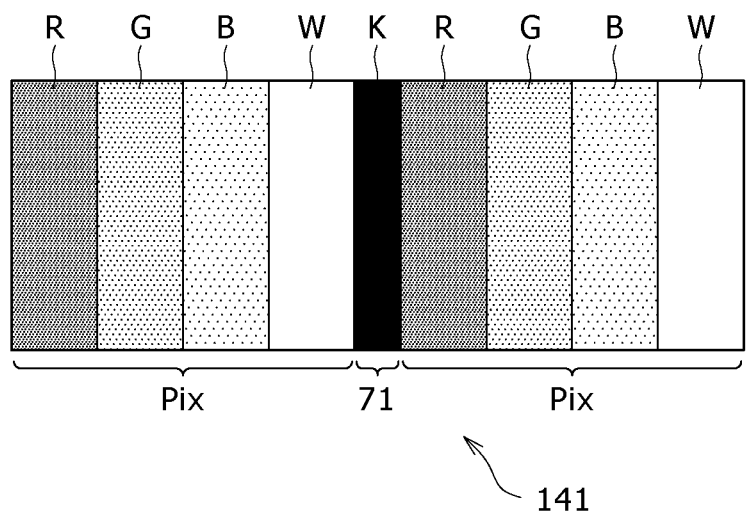
FIG. 26 is a diagram showing a structural example of a basic unit when the light receiving resolution is made half the display resolution by using the pixel shown in FIG. 24.
Figure 27:
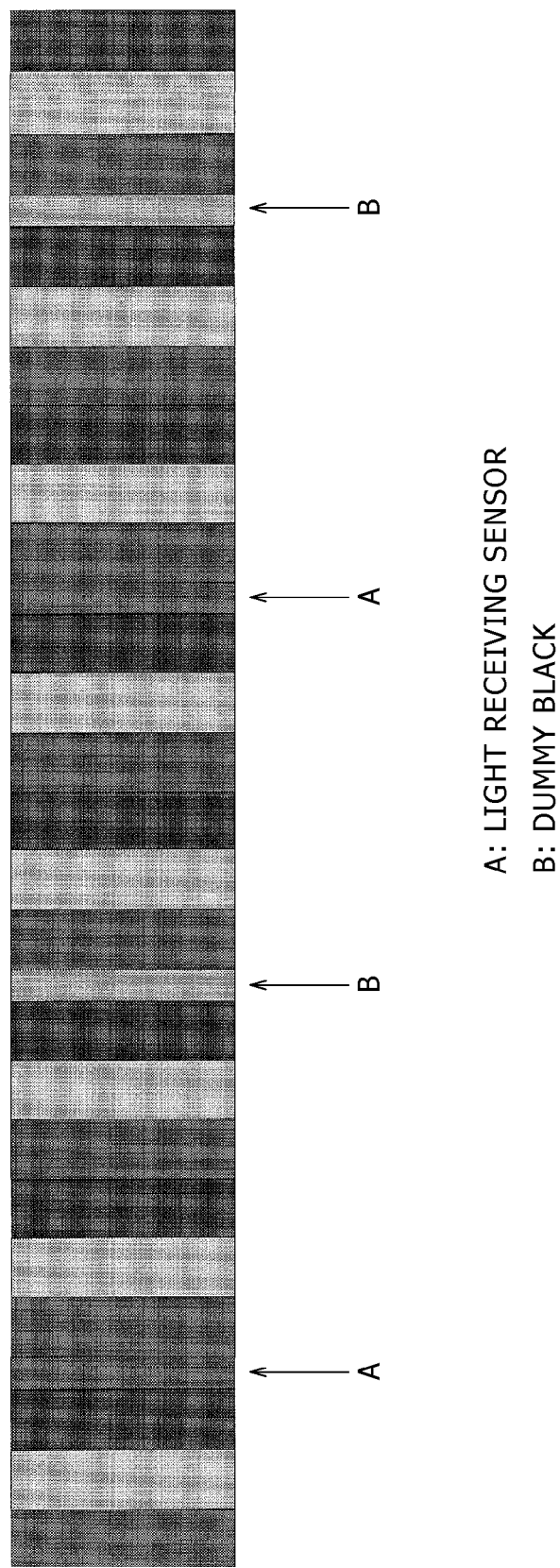
FIG. 27 is a diagram showing a structural example of the basic unit in which a light receiving sensor is provided in a dark portion region, and a dummy black portion having no light receiving sensor is provided in another dark region.
Figure 28:
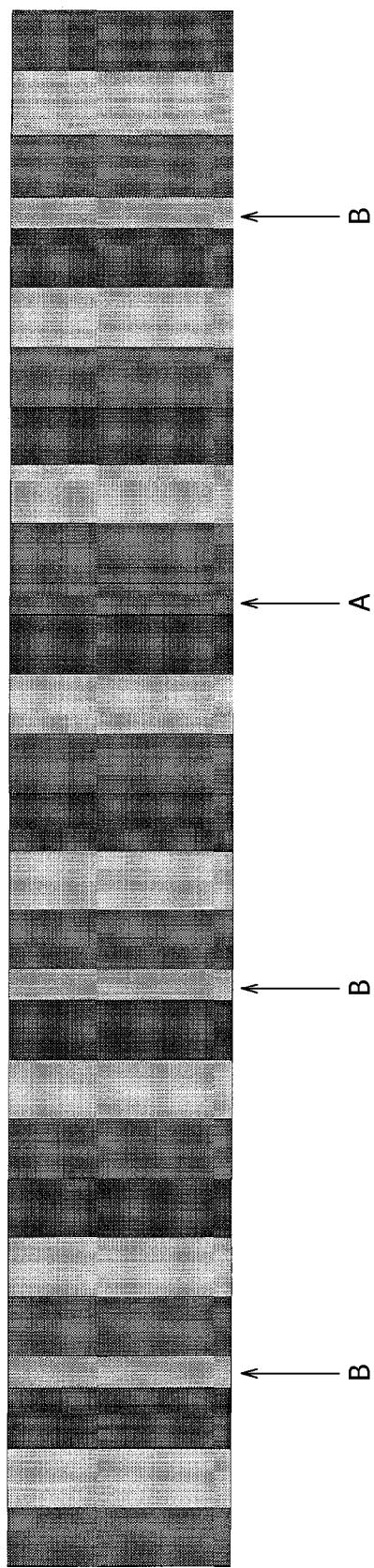
FIG. 28 is a diagram showing a structural example of the basic unit in which a light receiving sensor is provided in a dark portion region, and a dummy black portion having no light receiving sensor is provided in another dark region.
Figure 29:
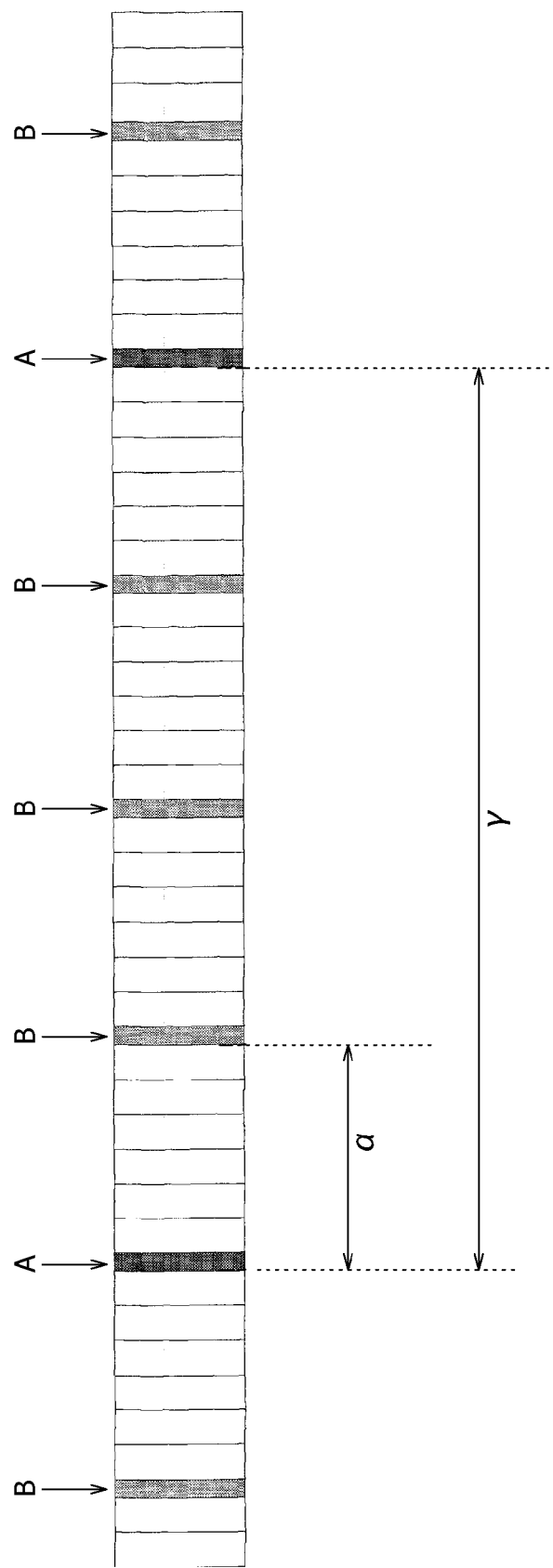
FIG. 29 is a diagram showing a structural example of the basic unit in which a light receiving sensor is provided in a dark portion region, and a dummy black portion having no light receiving sensor is provided in another dark region.

On the other hand, when the light receiving circuit regions 71 are discretely reduced and disposed for the disposition of the pixels Pix, for example, when the light receiving circuit regions 71 are discretely reduced and disposed so that the light receiving resolution becomes half the display resolution, as shown in FIG. 26, a basic unit 141 composed of two pixels Pix, and one light receiving circuit region 71 is repetitively disposed in the horizontal direction. In this case as well, the region of the pixel Pix becomes the light portion, and the light receiving circuit 71 becomes the dark portion. Also, since the spatial frequency of the repetitive pattern of the light portions and the dark portions becomes equal to or higher than 10 cpd in the horizontal direction, the display quality can be maintained.

It should be noted that the embodiment is not limited thereto, and the various changes thereof may be made by those skilled in the art without departing from the gist of the present application.

In the embodiment described above, the light receiving sensors (light receiving circuit regions) are disposed in all the dark portions, respectively. However, the present application is not limited thereto. That is to say, for example, as shown in FIGS. 27 to 31, a light receiving sensor may be provided in each of dark portion regions each being indicated by a reference symbol A. Also, a dummy black portion having no light receiving sensor disposed therein may be provided in each of dark regions each being indicated by a reference symbol B. In this case, the following conditional expression (2) is established:

$$\gamma = n \times \alpha \tag{2}$$

where γ is an interval between the adjacent two light receiving sensors, n is a natural number, and α is an interval between the adjacent two dark portions.

Figure 30:
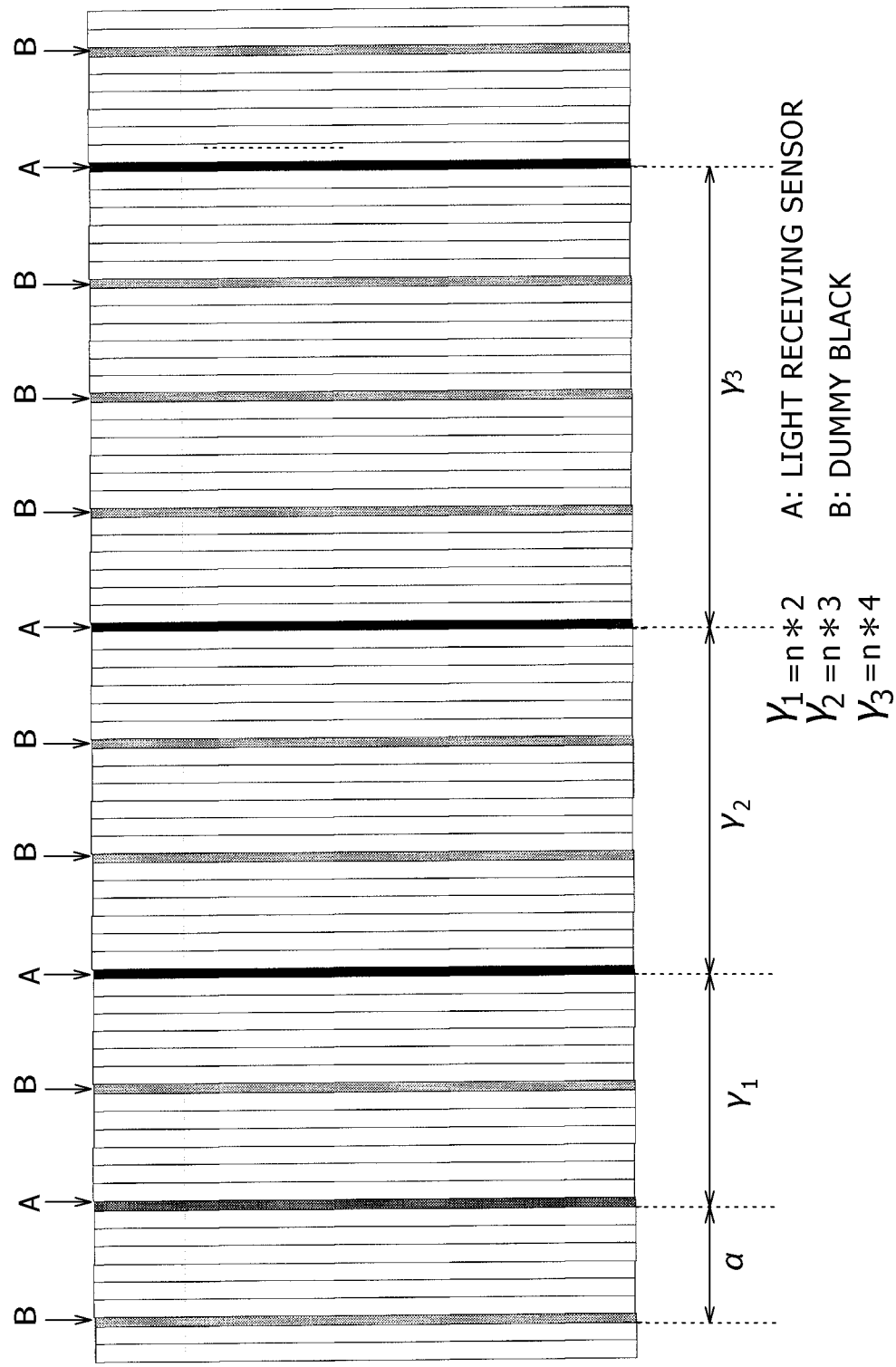
FIG. 30 is a diagram showing a structural example of the basic unit in which a pitch of light receiving sensors changes.

In addition, even when the interval between the adjacent two light receiving sensors changes as shown in FIG. 30, the above conditional expression (2) is established as it is. That is to say, in the case of the disposition as shown in FIG. 30, a correction arithmetic operation needs to be performed in the light receiving signal portion 26 (refer to FIG. 1).

Figure 31:
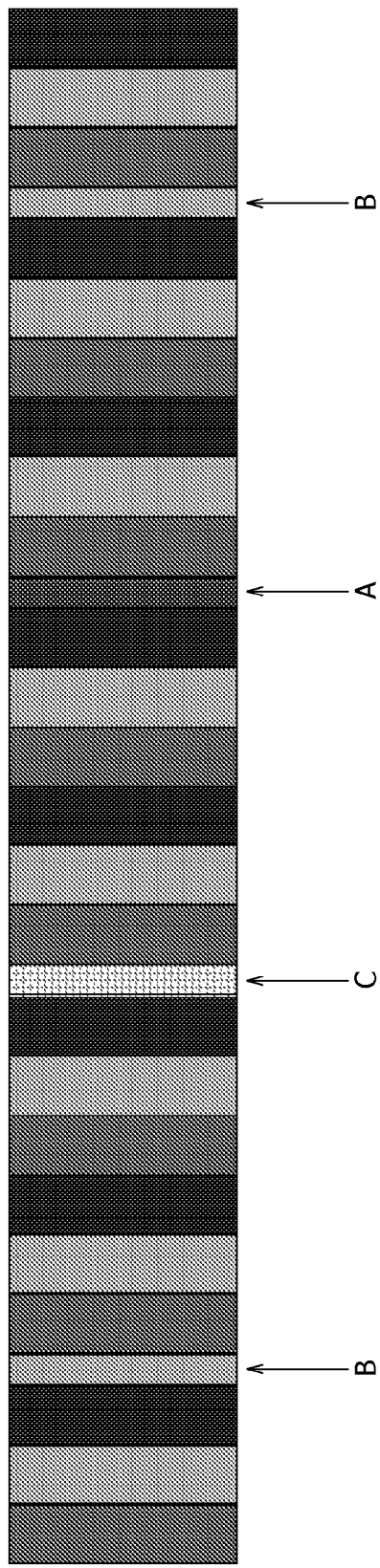
FIG. 31 is a diagram showing a structural example of the basic unit in which a light receiving sensor is provided in a dark portion region, and a dummy black portion having no light receiving sensor is provided in another dark region.

Also, as shown in FIG. 31, a dark portion region being disposed the light receiving sensor covered with a black mask may be further provided being indicated by a reference symbol C.

Figure 32:
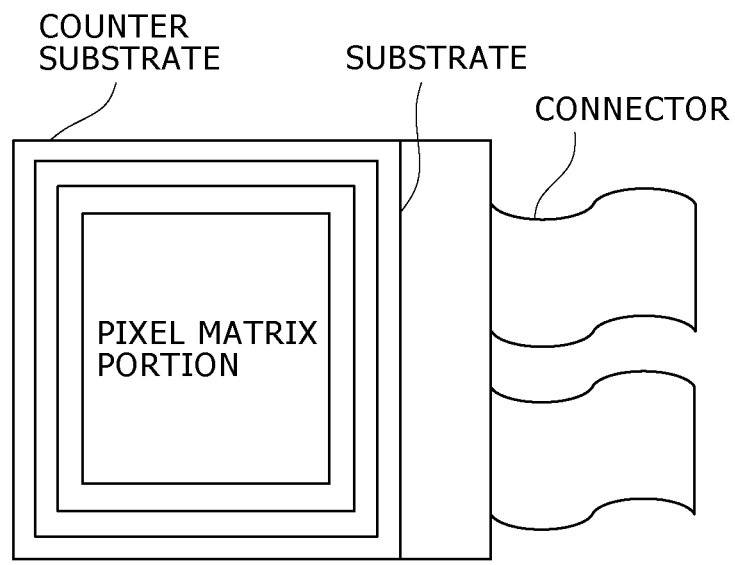
FIG. 32 is a plan view showing a structure of a module in a display device according a change of an embodiment.

The display device according to a change of the embodiment, as shown in FIG. 32, includes one having a flat type module shape. In this case, for example, a pixel array portion is provided in which pixels each being composed of an organic EL element, a thin film transistor, a thin film capacitor, a light receiving sensor, and the like are formed integrally with one another in matrix on an insulating substrate. Also, an adhesive agent is applied to the insulating substrate so as to surround the pixel array portion (pixel matrix portion), and a transparent counter substrate made of a glass or the like is stuck thereto, thereby manufacturing a display module. A color filter, a protective film, a light shielding film, or the like may be formed on the transparent counter substrate when necessary. Also, for example, a flexible printed circuit (FPC) may be provided as a connector through which a signal or the like is transmitted between the pixel array portion and the outside in the display module.

The display device of an embodiment as set forth hereinabove can be applied to the display devices, of the information processing apparatuses in all the fields, each of which has the flat panel shape, and each of which displays thereon a video signal inputted to an information processing apparatus such as a digital camera, a note type personal computer, a mobile phone, or a video camera, or generated in the information processing apparatus in the form of an image or a video. Hereinafter, examples of the information processing apparatus to each of which such a display device is applied will be shown.

Figure 33:
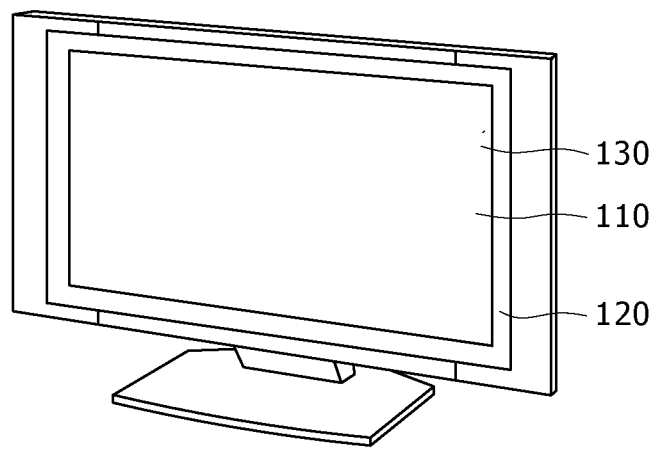
FIG. 33 is a perspective view showing a television receiver including the display device according to the embodiment.

FIG. 33 shows a television receiver to which an embodiment is applied. The television receiver includes an image display screen 110 composed of a front panel 120, a filter glass 130, and the like. The display device according to an embodiment is used in the image display screen 110, thereby manufacturing the television receiver.

Figure 34:
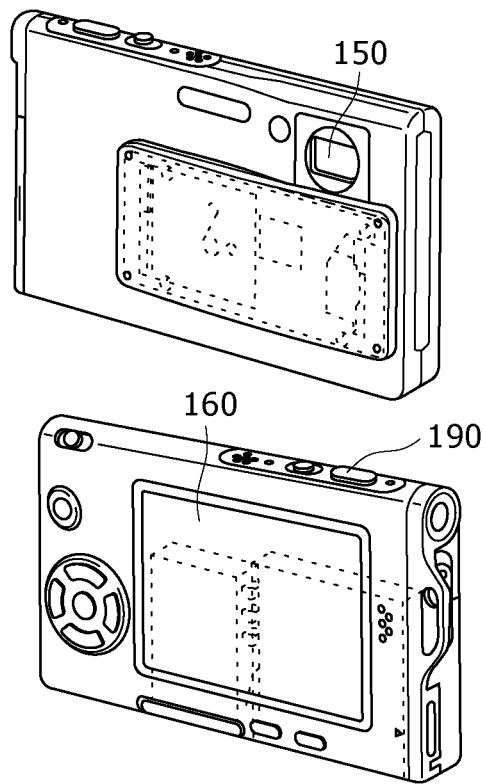
FIG. 34 is a perspective view showing a digital still camera including the display device according to an embodiment.

FIG. 34 shows a digital camera to which an embodiment is applied. Here, an upper portion of FIG. 34 is a front elevational view, and a low portion thereof is a rear elevational view. The digital camera includes an image capturing lens, a light emission portion 150 for flash, a display portion 160, a control switch, a menu switch, a shutter 190, and the like. The display device according to an embodiment is used in the display portion 160, thereby manufacturing the digital camera.

Figure 35:
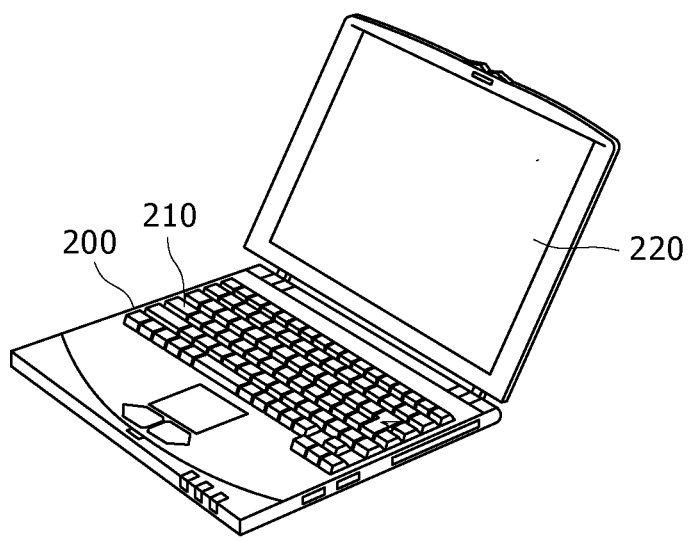
FIG. 35 is a perspective view showing a note type personal computer including the display device according to an embodiment.

FIG. 35 shows a note type personal computer. A main body 200 of the note type personal computer includes a keyboard 210 which is manipulated when characters or the like are inputted. A main body cover includes a display portion 220 for displaying thereon an image. The display device according to an embodiment is used in the display portion 220, thereby manufacturing the note type personal computer.

Figure 36:
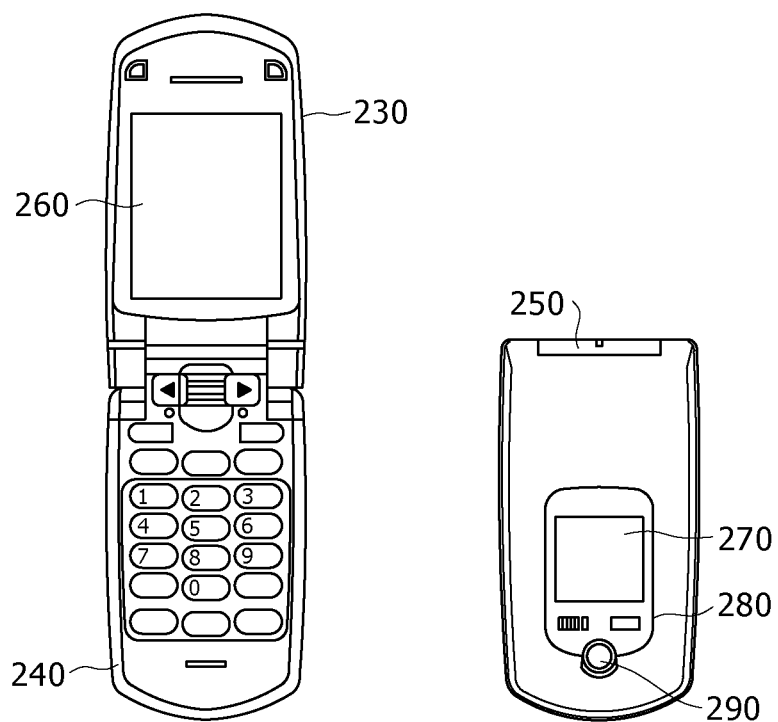
FIG. 36 is a schematic view showing a portable terminal apparatus including the display device according to an embodiment.

FIG. 36 shows a portable terminal apparatus to which an embodiment is applied. Here, a left portion of FIG. 36 shows a state in which the portable terminal apparatus is opened, and a right portion thereof shows a state in which the portable terminal apparatus is closed. The portable terminal apparatus includes an upper chassis 230, a lower chassis 240, a connection portion (a hinge portion in this example) 250, a display portion 260, a sub display portion 270, a picture light 280, a camera 290, and the like. The display device according to the embodiment is used in the display portion 260 or the sub display portion 270, thereby manufacturing the portable terminal apparatus.

Figure 37:
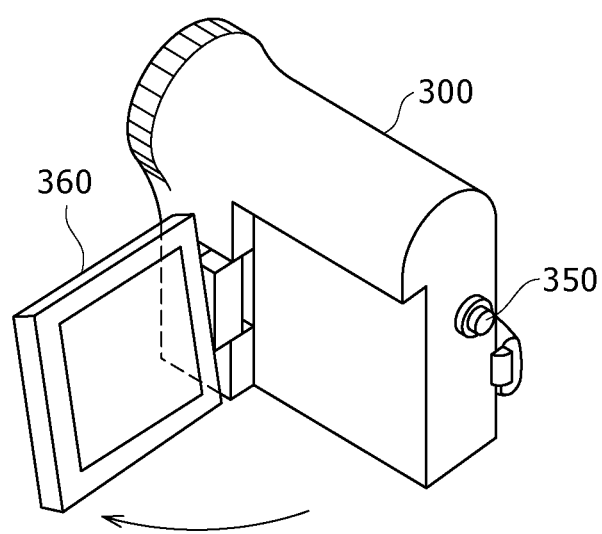
FIG. 37 is a perspective view showing a video camera including the display device according to an embodiment.

FIG. 37 shows a video camera to which an embodiment is applied. The video camera includes a lens 340 provided on a side face directed forward for photographing a subject, a start/stop switch 350 with which the photographing is started/stopped, a monitor 360, and the like. The display device according to the embodiment is used in the monitor 360, thereby manufacturing the video camera.

The invention is claimed as follows:

1. A display device comprising:
   a plurality of pixels for displaying an image;
   a plurality of light receiving sensors for detecting light, the plurality of light receiving sensors being arranged among the plurality of pixels; and
   a plurality of dummy black portions being covered with black masks or having no light receiving sensor, the plurality of dummy black portions being arranged among the plurality of pixels,
   wherein when a portion including the pixel is made a light portion, and each of a portion inducing the light receiving sensor and a portion including the dummy black portion is made a dark portion,
   wherein the light portion and the dark portion are disposed in a repetitive pattern,
   wherein a light receiving sensor pitch of the plurality of light receiving sensors is greater than a pixel pitch of the plurality of pixels,
   wherein the plurality of light receiving sensors and the plurality of dummy black portions are arranged so as to satisfy a conditional expression $y=n \times \alpha$ in which y is an interval between the adjacent two light receiving sensors, n is a natural number, and $\alpha$ is an interval between the adjacent two dark portions, and
   wherein the plurality of pixels, the plurality of light receiving sensors, and the plurality of dummy black portions are disposed such that a spatial frequency of the repetitive pattern becomes equal to or higher than 10 cpd.

2. The display device according to claim 1, wherein the spatial frequency of the repetitive pattern becomes equal to or lower than 18 cpd.

* * * * *